United States Patent
Prakash et al.

(10) Patent No.: US 10,929,515 B2
(45) Date of Patent: Feb. 23, 2021

(54) BIOMETRIC AUTHENTICATION TECHNIQUES

(71) Applicant: Apple Inc., Cupertino, CA (US)

(72) Inventors: Deepti S. Prakash, Sunnyvale, CA (US); Lucia E. Ballard, San Francisco, FL (US); Jerrold V. Hauck, Windermere, FL (US); Feng Tang, Cupertino, CA (US); Etai Littwin, Te Aviv (IL); Pavan Kumar Ansosalu Vasu, San Francisco, CA (US); Gideon Littwin, Tel Aviv (IL); Thorsten Gernoth, San Francisco, CA (US); Lucie Kucerova, Zdice (CZ); Petr Kostka, Prague (CZ); Steven P. Hotelling, Los Gatos, CA (US); Eitan Hirsh, Ramat Hasharon (IL); Tal Kaitz, Kiryat Ono (IL); Jonathan Pokrass, Herzliya (IL); Andrei Kolin, Herzliya (IL); Moshe Laifenfeld, Haifa (IL); Matthew C. Waldon, San Francisco, CA (US); Thomas P. Mensch, Sunnyvale, CA (US); Lynn R. Youngs, Cupertino, CA (US); Christopher G. Zeleznik, San Jose, CA (US); Michael R. Malone, San Jose, CA (US); Ziv Hendel, Herzliya (IL); Ivan Krstic, San Francisco, CA (US); Anup K. Sharma, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 101 days.

(21) Appl. No.: 16/049,933

(22) Filed: Jul. 31, 2018

(65) Prior Publication Data
US 2019/0044723 A1   Feb. 7, 2019

Related U.S. Application Data

(60) Provisional application No. 62/556,857, filed on Sep. 11, 2017, provisional application No. 62/556,365, (Continued)

(51) Int. Cl.
G06F 21/00 (2013.01)
G06F 21/32 (2013.01)
(Continued)

(52) U.S. Cl.
CPC .............. *G06F 21/32* (2013.01); *G06F 21/83* (2013.01); *G06K 9/00255* (2013.01); (Continued)

(58) Field of Classification Search
CPC .................................. G06F 21/32; G06F 21/83 (Continued)

(56) References Cited

U.S. PATENT DOCUMENTS

| 5,933,502 A | 8/1999 | Aucsmith et al. |
| 8,832,465 B2 | 9/2014 | Gulati et al. |

(Continued)

FOREIGN PATENT DOCUMENTS

| EP | 2560123 | 2/2013 |
| EP | 2701097 | 2/2014 |

(Continued)

OTHER PUBLICATIONS

IOs Security—White Paper, iOS 10, Mar. 2017, 68 pages.
International Search Report and Written Opinoin in PCT Application No. PCT/US2018/015498 dated Apr. 17, 2018, 11 pages.

*Primary Examiner* — Anthony D Brown
(74) *Attorney, Agent, or Firm* — Kowert, Hood, Munyon, Rankin & Goetzel, P.C.

(57) ABSTRACT

Techniques are disclosed relating to biometric authentication, e.g., facial recognition. In some embodiments, a device
(Continued)

is configured to verify that image data from a camera unit exhibits a pseudo-random sequence of image capture modes and/or a probing pattern of illumination points (e.g., from lasers in a depth capture mode) before authenticating a user based on recognizing a face in the image data. In some embodiments, a secure circuit may control verification of the sequence and/or the probing pattern. In some embodiments, the secure circuit may verify frame numbers, signatures, and/or nonce values for captured image information. In some embodiments, a device may implement one or more lockout procedures in response to biometric authentication failures. The disclosed techniques may reduce or eliminate the effectiveness of spoofing and/or replay attacks, in some embodiments.

20 Claims, 12 Drawing Sheets

Related U.S. Application Data filed on Sep. 9, 2017, provisional application No. 62/556,363, filed on Sep. 9, 2017, provisional application No. 62/556,357, filed on Sep. 9, 2017, provisional application No. 62/540,040, filed on Aug. 1, 2017, provisional application No. 62/540,036, filed on Aug. 1, 2017, provisional application No. 62/679,657, filed on Jun. 1, 2018.

(51) Int. Cl.

| | |
|---|---|
| *G06K 9/00* | (2006.01) |
| *H04L 9/32* | (2006.01) |
| *H04W 12/06* | (2021.01) |
| *H04L 29/06* | (2006.01) |
| *G06F 21/83* | (2013.01) |
| *H04L 9/08* | (2006.01) |

(52) U.S. Cl.
CPC ..... *G06K 9/00288* (2013.01); *G06K 9/00899* (2013.01); *H04L 9/085* (2013.01); *H04L 9/0844* (2013.01); *H04L 9/3228* (2013.01); *H04L 9/3231* (2013.01); *H04L 9/3234* (2013.01); *H04L 9/3247* (2013.01); *H04L 63/0861* (2013.01); *H04W 12/06* (2013.01)

(58) Field of Classification Search
USPC ........................................................ 713/186
See application file for complete search history.

(56) References Cited

U.S. PATENT DOCUMENTS

| | | |
|---|---|---|
| 9,479,500 B2 | 10/2016 | Bud |
| 9,992,474 B2 * | 6/2018 | Grunnet-Jepsen ... H04N 13/239 |
| 2009/0097377 A1 * | 4/2009 | Salomon ................ B82Y 10/00 |
| | | 369/100 |
| 2009/0287930 A1 * | 11/2009 | Nagaraja ................... H04L 9/08 |
| | | 713/171 |
| 2013/0044920 A1 | 2/2013 | Langley et al. |
| 2014/0169642 A1 | 6/2014 | Law et al. |
| 2015/0033305 A1 | 1/2015 | Shear et al. |
| 2015/0047016 A1 | 2/2015 | Wilhelm |
| 2015/0302252 A1 | 10/2015 | Herrera |
| 2015/0339471 A1 | 11/2015 | Bennett et al. |
| 2016/0006914 A1 | 1/2016 | Neumann |
| 2016/0026862 A1 | 1/2016 | Anderson |
| 2016/0063235 A1 | 3/2016 | Tussy |
| 2017/0337413 A1 | 11/2017 | Bhat et al. |

FOREIGN PATENT DOCUMENTS

| | | | |
|---|---|---|---|
| EP | 2993619 | 3/2016 | |
| WO | 9828707 | 7/1998 | |
| WO | WO-2005112009 A2 * | 11/2005 | ............... G06K 7/14 |

* cited by examiner

BIOMETRIC AUTHENTICATION TECHNIQUES

This application claims the benefit of U.S. Provisional Application No. 62/540,036, filed on Aug. 1, 2017; U.S. Provisional Application No. 62/540,040, filed on Aug. 1, 2017; U.S. Provisional Application No. 62/556,357, filed on Sep. 9, 2017; U.S. Provisional Application No. 62/556,363, filed on Sep. 9, 2017; U.S. Provisional Application No. 62/556,365, filed on Sep. 9, 2017; U.S. Provisional Application No. 62/556,857, filed on Sep. 11, 2017; and U.S. Provisional Application No. 62/679,657 filed Jun. 1, 2018, each of which is incorporated by reference herein in their respective entireties.

BACKGROUND

Technical Field

This disclosure relates generally to user authentication, and, more specifically, to computing devices that collect biometric data for user authentication.

Description of the Related Art

Traditional authentication measures typically rely on a user to provide one or more credentials to show that the user is an authorized user. For example, a mobile device attempting to authenticate a user may ask the user to supply a password before allowing the user to access the device. In an effort to reduce the burden on a user, some devices may now ask a user to supply a biometric credential. For example, a mobile device may include a fingerprint sensor configured to collect fingerprint biometric information, which may be compared with stored fingerprint information of a known user. As another example, a mobile device may use facial recognition to authenticate a known user. Biometric authentication may be advantageous as it allows a user to authenticate more quickly than, for example, entering a password or some other credential. Devices should be designed, however, to avoid replay and spoofing attacks, e.g., where a malicious entity attempts to trick biometric sensors into incorrectly indicating that the correct user is present.

SUMMARY

Techniques are disclosed relating to preventing or reducing security threats relating to biometric sensors, e.g., for facial recognition. In some embodiments, a device is configured to generate a pseudo-random sequence of image capture modes using at least two different modes. For example, the sequence may include two-dimensional (e.g., with flood illumination) and three-dimensional (e.g., with depth illumination) capture modes. In some embodiments, a secure circuit is configured to verify the sequence in image data from the camera unit and may determine whether to allow facial recognition to proceed based on whether the sequence was used.

In some embodiments, a device is configured to use a secret illumination pattern (which may be referred to as a probing pattern) for at least one image associated with a facial recognition session. This probing pattern may be pseudo-randomly determined from among a plurality of illumination patterns (e.g., with statically configured arrays for different patterns and/or dynamically adjustable patterns). For example, the pattern may include only a subset of infrared dots in an array of dot projectors used for a depth capture mode. In some embodiments, a secure circuit is configured to verify that the illumination pattern is present in image data from the camera unit and may determine whether to allow facial recognition to proceed based on whether the pattern was used.

In some embodiments, the device is configured to use the secret illumination pattern only after verifying a pseudo-random sequence of capture modes, or vice versa, which may further reduce the likelihood of a successful attack.

Figure 1:
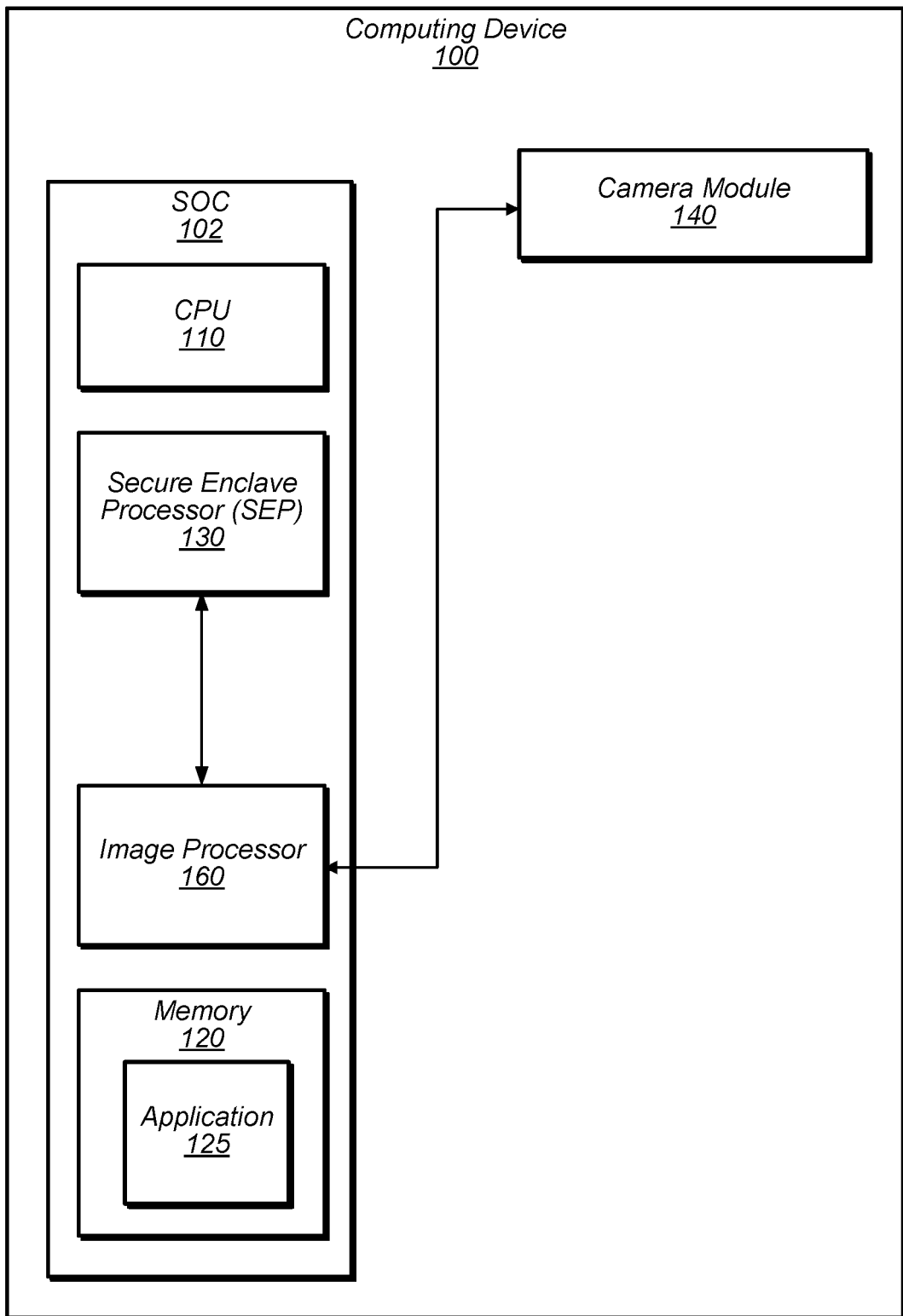
FIG. 1 is a block diagram illustrating an exemplary computing device, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Overview of Exemplary Device

The present disclosure is generally directed to techniques for preventing spoofing or replays of biometric data, e.g., images used for facial recognition. "Replay" attacks involve using previously-captured biometric information that is typically valid (e.g., image data of an authorized person's face that previously passed biometric authentication) in an attempt to authenticate an individual. Malicious entities may attempt to present previously-captured images of a user to a camera of a device, for example, to pass an authentication process as an enrolled user of the device. "Spoofing" attacks typically utilize invalid data, e.g., data from another device or module purporting to be from a device's camera or images of masks, busts, 3D projections, etc. that are not actually current images of a known user. For example, malicious entities may send signals pretending to be from a device's camera unit, to trick the device into thinking that its camera captured an image of the user, when the image was actually previously-captured by another camera. This is one example of an attack that involves spoofing a camera. As another spoofing example, a malicious entity may present a mask or bust of an enrolled user to a camera of the device in an attempt to pass an authentication process as the enrolled user. In various embodiments, the disclosed techniques may reduce or eliminate the effectiveness of such schemes, such that authorized users who intend to authenticate biometrically are successfully authenticated while others are denied.

Turning now to FIG. 1, a block diagram of a computing device 100 is depicted. In the illustrated embodiment, computing device 100 includes a system on a chip (SOC) 102 having a central processing unit (CPU) 110, memory 120 including an application 125, secure enclave processor (SEP) 130, camera unit 140, and image processor 160. In some embodiments, computing device 100 may be implemented differently than shown. For example, in some embodiments, elements may not be included in an SOC or different combinations of elements may be included in an SOC, additional elements may be included, etc.

CPU 110 may include one or more processor cores. Generally, a processor core may include circuitry configured to execute instructions defined in an instruction set architecture implemented by the processor. Processors may be implemented on an integrated circuit with other components as a system on a chip (SOC) or other levels of integration. Processors may further include discrete microprocessors, processor cores and/or microprocessors integrated into multichip module implementations, processors implemented as multiple integrated circuits, etc.

Memory 120, in the illustrated embodiment, is configured to store program instructions of application 125. Memory 120 may generally include circuitry for storing data. For example, memory 120 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 100 may include a memory controller (not shown) that may include queues for memory operations, for ordering (and potentially reordering) the operations and presenting the operations to the memory 120. The memory controller may further include data buffers to store write data awaiting write to memory and read data awaiting return to the source of the memory operation. In some embodiments, the memory controller may include a memory cache to store recently accessed memory data. In some embodiments memory 120 may include program instructions, such as instructions of application 125 that are executable by one or more processors to cause device 100 to perform various functionality described herein.

Application 125, in some embodiments, is an application executable by CPU 110 to facilitate performance of object recognition, e.g., for user authentication. Execution of application 125 may cause CPU 110 to communicate with camera unit 140 (e.g., via image processor 160) to perform facial recognition. In some embodiments, SEP 130 is involved in the facial recognition process, in place of or in addition to CPU 110. For example, SEP 130 may execute internal program code or include dedicated circuitry to facilitate facial recognition. Examples of applications for which authentication may be performed include, without limitation: payment application, third party applications, an application for downloading other application, an application that performs cryptographic operations, an application that provides access to sensitive data stored in the device etc.

SEP 130, in the illustrated embodiment, is a secure circuit configured to authenticate an active user (i.e., the user that is currently interacting with device 100), to perform an action such as a cryptographic operation (examples of cryptographic operations may include unlocking a device, accessing keychain data, auto-filling data in a browser, accessing payment data (e.g., in a separate secure element), authorizing a payment procedure, accessing or downloading an application, consenting to operations on the device 100 or a remote device, etc.). As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, control of peripheral devices or other circuitry, etc. This internal resource may also be circuitry that performs services/operations associated with sensitive data. As will be described below with reference to FIG. 3, this circuitry may include an image sensor pipeline that is configured to verify biometric data captured by camera 140 for a user by comparing it with previous collected biometric data of an authorized user. In some embodiments, discussed in further detail below with reference to FIG. 2, SEP 130 is configured to perform one or more procedures to verify biometric data that is indicated as being captured by camera unit 140 (e.g., by virtue of being sent on a bus connected to camera unit 140, stored in a memory location used for image data from camera unit 140, etc.).

Camera module 140, in the illustrated embodiment, is configured to collect biometric data from a user (e.g., a user's face) in order to authenticate the user. As used herein, "biometric data" refers to data that uniquely identifies the user among other humans (at least to a high degree of accuracy) based on the user's physical or behavioral characteristics. Camera 140 may use any suitable technique to collect biometric data. Accordingly, in some embodiments, camera 140 may include an infrared (IR) emitter and an IR camera that are configured to capture one or more two-dimensional and three-dimensional (e.g., flood and depth) image frames. When capturing a flood frame, the IR emitter may emit light from a single source, and the IR camera may collect two-dimensional image data from an object (e.g., a user's face or some other object purporting to be a user's face). When capturing a depth image frame, the IR emitter may project multiple light sources (e.g., using laser illumination) onto a user's face, and the IR camera may capture the reflections of those light sources to determine multiple depth points indicating distances from the IR camera to respective portions of the user's face. In some embodiments, the combination of flood and depth image data may allow for SEP 130 to compare faces in a three-dimensional space. In some embodiments, camera unit 140 is also configured to capture image data in the visible-light spectrum. In various embodiments, camera unit 140 communicates biometric data to SEP 130 via a secure channel. As used herein, the term "secure channel" refers to either a dedicated path for communicating data (i.e., a path shared by only the intended participants) or communicating encrypted data or signed data using cryptographic keys known only to the intended participants. In some embodiments, camera unit 140 and/or image processor 160 may perform various processing operations on biometric data before supplying it to SEP 130 in order to facilitate the comparison performed by SEP 130. In some embodiments, application 125 may perform a registration process (which may also be referred to as an enrollment process) in which camera unit 140 captures biometric data from an authorized user in order to permit SEP 130 to subsequently authenticate the user.

Figure 2:
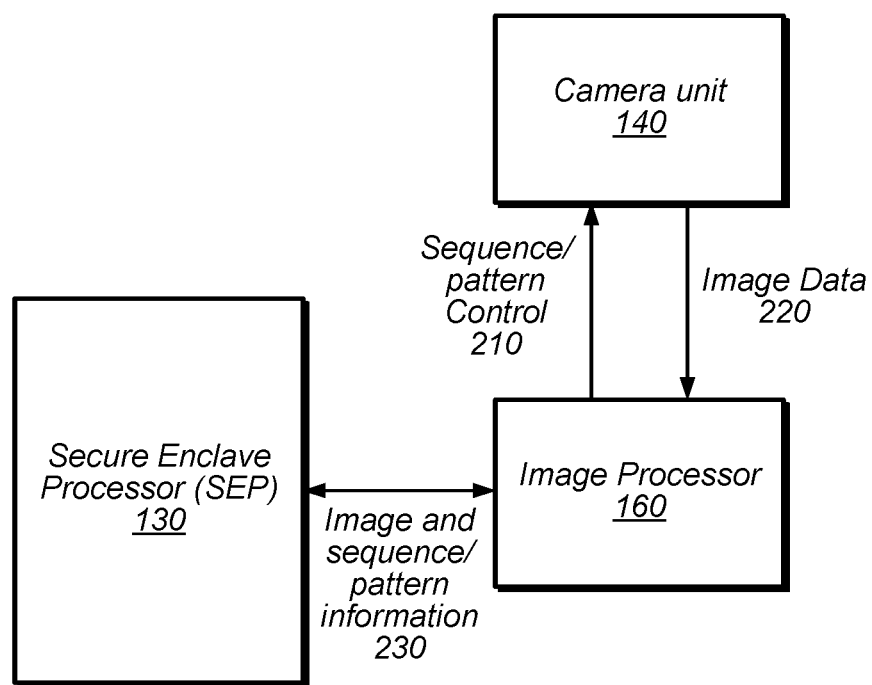
FIG. 2 is a block diagram illustrating an exemplary secure circuit, camera unit, and image processor, according to some embodiments.

FIG. 2 is a block diagram illustrating a portion of device 100 that includes SEP 130, camera unit 140, and image processor 160, according to some embodiments. In some embodiments, image processor 160 may be omitted and its functionality may be performed by SEP 130, for example.
Overview of Using Pseudo-Random Sequence of Image Capture Modes In the illustrated embodiment, image processor 160 pseudo-randomly generates a sequence of image capture modes for a facial recognition session by camera unit 140, where the camera unit is expected to use the generated sequence for the facial recognition session. In other embodiments, another element (such as SEP 130 or camera unit 140) may be configured to generate the sequence. In the illustrated embodiment, image processor 160 provides the sequence information to the SEP 130 so that SEP 130 can confirm that the input data was captured in the expected sequence and also sends sequence control information 210 to camera unit 140 based on the determined sequence.

In some embodiments, camera unit 140 is configured to capture multiple pairs of images for a facial recognition session. Note that the pairs of images may be captured by different sensors in the same camera unit, the same sensor in the same camera unit, or by multiple different camera units, in some embodiments. Each pair may include an image captured using a two-dimensional capture mode (e.g., using flood illumination) and an image captured using a three-dimensional capture mode (e.g., using multiple points illumination, which may project on different regions). In some embodiments, image processor 160 and/or SEP 130 are configured to combine the images in each pair to generate a composite image that is used for facial recognition (e.g., to accurately map the geometry of a face). In some embodiments, image processor 160 and/or SEP 130 are configured to process the composite image to determine characteristics of the image (e.g., facial feature vectors), which SEP 130 is configured to compare with stored template characteristics one or more known users of device 100 (e.g., using one or more neural networks).

In other embodiments, any of various different image capture modes may be utilized in a pseudo-random sequence, including using different camera sensors, different illumination modes (e.g., flood, depth, different wavelengths of light, different intensities, etc.), different resolutions, different exposure times, etc. Although pairs of image captures are discussed herein, the pseudo-random sequence of capture modes is in no way limited to pairs of image captures. For example, a pseudo-random sequence could include N image captures of a first type followed by M image captures of a second type, various interleaving between the types, and so on. Speaking generally, the sequence may be pseudo-randomly determined for a particular group or set of image captures. In the specific context of image and depth capture, each set could include two flood and one depth capture, three depth and one flood capture, etc. In some embodiments, one or more of the image capture modes may not actually be used to capture image data used for facial recognition, but may simply be inserted into the sequence for security purposes. For example, a solo depth capture may be inserted into the sequence of image capture modes in a pseudo-random fashion, without being combined with a flood capture, in order to further add unpredictability to the sequence.

The pseudo-random sequence may be generated using any of various appropriate implementations, including one or more random number generators, which may be included in image processor 160 or SEP 130. The term "pseudo-random" refers to values that satisfy one or more statistical tests for randomness but are typically produced using a definite mathematical process, e.g., based on one or more seed values, which may be stored or generated by SEP 130 and used by SEP 130 or sent to another processing element. In some embodiments, any of various sequences described herein as pseudo-random may actually be random, but true randomness is typically difficult to generate using computer hardware. In some embodiments, the number of image captures and/or the number of pairs of image captures may be pseudo-randomly determined.

In other embodiments, the sequence of image captures modes may not be pseudo-randomly determined, but may be otherwise selected or determined.

In some embodiments, image processor 160 generates the pseudo-random sequence and informs camera module 140 of the sequence. Camera module 140 then produces image data 220 and stores it in a memory location accessible to image processor 160. Image processor 160 then processes the image and stores the processed image data (with metadata indicating the sequence used) in a memory location accessible to SEP 130. The image data may be cryptographically signed and/or encrypted using a session key. SEP 130 may verify image data authenticity and integrity before accessing the image data and then may that it exhibits the sequence indicated by the metadata. The metadata may be cryptographically signed and/or encrypted using a session key, in some embodiments. Similarly, the sequence may be encrypted when sent to camera module 140, in embodiments in which camera module 140 supports encryption.

Overview of Secret Illumination Pattern Techniques

In some embodiments, image processor 160 selects an illumination pattern for one or more image captures by the camera unit 140 for a facial recognition session. In some embodiments, the illumination pattern is selected pseudo-randomly from among multiple patterns supported by camera unit 140. The pattern may be referred to herein as a "probing" pattern, which may be different than other patterns used for depth capture for facial recognition matching. In other embodiments, another element (e.g., SEP 130) is configured to select the pattern. In some embodiments, different devices are configured with different illumination patterns during manufacturing, and the pattern(s) may be kept secret, e.g., by secure keys that are only accessible to SEP 130. In some embodiments, illumination pattern(s) are dynamically generated for a given facial recognition session.

In the illustrated embodiment, image processor 160 provides the pattern information to SEP 130 so that SEP 130 can confirm the pattern and also sends pattern control information 210 to camera unit 140 based on the determined pattern. In some embodiments, a single pattern or a small number of patterns may be implemented for a given device (e.g., by permanently configuring one or more special emitter arrays) and the pattern may be kept secret. In some embodiments, SEP 130 is configured to allow facial recognition authentication only if the selected pattern is detected in image data generated by camera unit 140.

In some embodiments, the pattern uses only a subset of a plurality of illumination points available for depth capture. The illumination points may be individually controllable or may be controlled in groups. For example, for an exemplary 4×4 array of illumination points, each of the sixteen points may be individually controlled or the array may be split into groups (e.g., 2×2 quadrants) that device 100 is configured to enable or disable at the group granularity. The number, location, type, and/or intensity of points that are activated may be selected pseudo-randomly.

The illumination points may be laser generated, for example, and only a subset of the laser elements may be activated. The captured image using the selected illumination pattern may or may not be used for actual facial recognition processing. For example, illumination patterns may be selected that are not particularly useful in facial recognition, but may be useful for providing randomness to prove that image data was captured using known camera unit 140.

In some embodiments, the disclosed illumination pattern techniques may be combined with other security mitigation techniques such as verification of a pseudo-randomly generated sequence. For example, device 100 may be configured to use a particular illumination pattern only after verification of a pseudo-random sequence of image capture modes, verification that image data is signed, verification of a nonce for each image, etc. In other embodiments, device 100 may be configured to generate a pseudo-random sequence of capture modes only after verifying a particular illumination pattern. In some embodiments, the illumination pattern may be used within the sequence of capture modes in a pseudo-random location in the expected sequence of image capture modes. Speaking generally, various verification techniques discussed herein may be used in combination in various orderings to improve authentication security.

In some embodiments, multiple illumination patterns may be selected (for use in sequence and/or in parallel) and may be used in the pseudo-random sequence of depth capture modes, and may further be pseudo-randomly interspersed among other image capture modes. Further, multiple illumination patterns may be used together, in parallel or in a particular sequence. In these embodiments, SEP 130 may be configured to allow facial recognition authentication only in response to verifying both the illumination patterns and the sequence of patterns and/or capture modes.

Exemplary Secure Circuit Techniques for Authentication Security

In some embodiments, SEP 130 is configured to generate a cryptographic nonce for each image captured by camera unit 140 for facial recognition. The term "nonce" is intended to be construed according to its well-understood meaning, which includes a random or pseudo-random number that is produced to be used once. In some embodiments, camera unit 140 or image processor 160 is configured to embed a received nonce with each image (or with composite image data or data that specifies image characteristics). In some embodiments, camera unit 140 or image processor 160 is configured to sign image data for each image (or composite image data or data that specifies image characteristics) using a session key established between SEP 130 and camera unit 140 or image processor. In some embodiments, SEP 130 is configured to confirm that incoming data includes the correct nonce and was signed and was signed using the session key before using the data for a facial recognition session (and may indicate a failure if the correct nonce is not found). In some embodiments, the nonce and/or signature using a session key may prevent replay using previously-captured images, which would not have the correct nonce and/or signature.

In some embodiments, SEP 130 is configured to communicate with one or both of image processor 160 and camera unit 140 using a secure channel. This may involve encrypted and/or cryptographically signed communications based on a secure exchange of cryptographic keys. One example of a technique for exchanging keys over a potentially public channel is to establish an elliptic curve Diffie Hellman (ECDH) session. In some embodiments, ECDH keys may be used to sign messages between processing elements in order to reduce the likelihood that received image data is being spoofed (e.g., by another processing element). Other public/private key techniques may similarly be used to sign data, in various embodiments. Various disclosed communications may be encrypted and/or signed.

Using these techniques, if a malicious device sends image data purporting to be from camera unit 140, SEP may be able to detect that the image data is not actually from camera unit 140 if it is not correctly signed. In some embodiments, to improve security, SEP 130 is configured to use a different ECDH session and key for each facial recognition session. For example, once a user is authenticated or authentication fails for a given facial recognition session, SEP 130 may perform a new ECDH key exchange for the next facial recognition session.

In some embodiments, SEP 130 and/or image processor 160 are configured to communicate with camera unit 140 via a dedicated bus that is not available for communications by other modules. In some embodiments SEP 130 is configured to require re-authentication using a particular type of credential in response to a disconnect of the dedicated camera bus. For example, in some embodiments device 100 is configured to present a lock screen and require manual user entry of a PIN or password in response to disconnect of the dedicated camera bus. As another example, in some embodiments device 100 is configured to require multiple types of authentication credentials (e.g., both biometric and manual entry) in response to a disconnect of the dedicated camera bus. Additional examples of lockout types for a device are discussed in detail below.

Exemplary Secure Circuit Implementation

Figure 3:
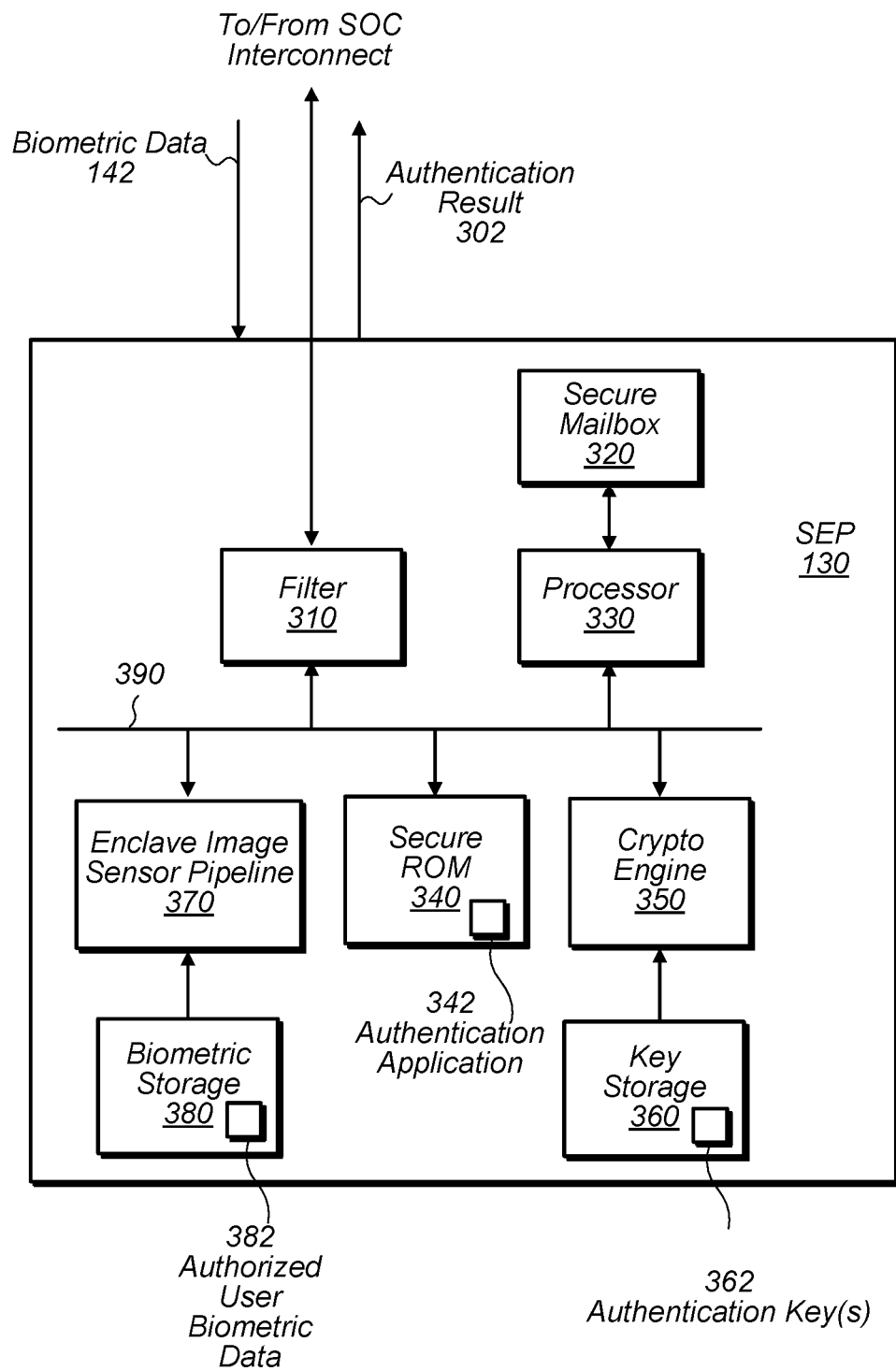
FIG. 3 is a block diagram illustrating an exemplary secure circuit implementation, according to some embodiments.

Turning now to FIG. 3, a block diagram of SEP 130 is depicted, according to some embodiments. In the illustrated embodiment, SEP 130 includes a filter 310, secure mailbox 320, processor 330, secure ROM 340, cryptographic engine 350, a key storage 360, an enclave image sensor pipeline 370, and biometric storage 380 coupled together via an interconnect 390. In some embodiments, SEP 130 may include more (or less) components than shown in FIG. 3. As noted above, SEP 130 is a secure circuit that protects an internal resource such as components user authentication keys 362 and/or enclave image sensor pipeline 370. As discussed below, SEP 130 implements a secure circuit through the use of filter 310 and secure mailbox 320.

Filter 310, in the illustrated embodiment, is circuitry configured to tightly control access to SEP 130 to increase the isolation of the SEP 130 from the rest of the computing device 100, and thus the overall security of the device 100. More particularly, in some embodiments, filter 310 is configured to permit read/write operations from a CPU 110 (or other peripherals on a fabric coupling CPU 110 and SEP 130) to enter SEP 130 only if the operations address the secure mailbox 320. Therefore, other operations may not progress from the interconnect 180 into SEP 130, in these embodiments. In some embodiments, these techniques using filter 310 are applied to accesses to data for enclave image sensor pipeline 370. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. Therefore, secure mailbox 320 includes predetermined memory locations that are accessible to other elements in device 100 and the remainder of the circuitry in SEP 130 is not accessible to other elements of device 100. In some embodiments, filter 310 may respond to other read/write operations with an error. In one embodiment, filter 310 may sink write data associated with a filtered write operation without passing the write data on to local interconnect 390. In one embodiment, filter 310 may supply non-secure data as read data for a filtered read operation. This data (e.g., "garbage data") may generally be data that is not associated with the addressed resource within the SEP 130. Filter 310 may supply any data as garbage data (e.g. all zeros, all ones, random data from a random number generator, data programmed into filter 310 to respond as read data, the address of the read transaction, etc.).

In some embodiments, filter 310 may only filter externally issued read/write operations. Thus, the components of the SEP 130 may have full access to the other components of computing device 100 including CPU 110, memory 120, image processor 160, and/or camera unit 140. Accordingly, filter 310 may not filter responses from interconnect 180 that are provided in response to read/write operations issued by SEP 130.

Secure mailbox 320 is circuitry that, in some embodiments, includes an inbox and an outbox. Both the inbox and the outbox may be first-in, first-out buffers (FIFOs) for data, for example. The buffers may have any size (e.g. any number of entries, where each entry is capable of storing data from a read/write operation). Particularly, the inbox may be configured to store write data from write operations sourced from CPU 110. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., application 125) may request services of SEP 130 via an application programming interface (API) supported by an operating system of computing device 100—i.e., a requester may make API calls that request services of SEP 130. These calls may cause corresponding requests to be written to mailbox mechanism 320, which are then retrieved from mailbox 320 and analyzed by processor 330 to determine whether it should service the requests. Accordingly, this API may be used to deliver biometric data to mailbox 320, request authentication of a user by verifying this information, and delivering an authentication result 302 via mailbox. By isolating SEP 130 in this manner, integrity of enclave image sensor pipeline 370 may be enhanced.

SEP processor 330, in the illustrated embodiment, is configured to process commands received from various sources in computing device 100 (e.g. from CPU 110) and may use various secure peripherals to accomplish the commands. Processor 330 may then execute instructions stored in secure ROM 340 and/or in a trusted zone of SoC memory 120, such as authentication application 342 to perform an authentication of a user. In other embodiments, authentication application 354 may be stored elsewhere, e.g., as firmware that is loaded to a part of SoC memory. In these embodiments, secure ROM 340 may verify such firmware before executing it. For example, SEP processor 330 may execute application 342 to provide appropriate commands to enclave image sensor pipeline 370 in order to verify biometric data. In some embodiments, application 342 may include encrypted program instructions loaded from a trusted zone in memory 120.

Secure ROM 340, in the illustrated embodiment, is a memory configured to store program instruction for booting SEP 130. In some embodiments, ROM 340 may respond to only a specific address range assigned to secure ROM 340 on local interconnect 390. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, etc.

Cryptographic engine 350, in the illustrated embodiment, is circuitry configured to perform cryptographic operations for SEP 130, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for decrypting traffic received from camera unit 140 described above and encrypting traffic sent to other processing elements.

Key storage 360, in the illustrated embodiment, is a local memory (i.e., internal memory) configured to store cryptographic keys. In some embodiments, these keys may include keys used to establish the secure channels between SEP 130 and other processing elements. As shown, in some embodiments, these keys include authentication keys 362. The keys may allow for various cryptographic operations and also may be used for other elements of the system to indicate whether the user is authenticated (e.g., to indicate that the user is authenticated for specific operations, such as to a secure element for payment operations).

Enclave image sensor pipeline 370, in some embodiments, is circuitry configured to compare biometric data captured from a user being authenticated with biometric data 372 of an authorized user. Various functionality described herein as being performed by image processor 160 may be performed by image sensor pipeline 370 in other embodiments or vice versa. In some embodiments, pipeline 370 may perform the comparison using a collection of neural networks included in pipeline 370, each network being configured to compare biometric data captured in a single frame or composite frame with biometric data 372 captured in multiple frames for an authorized user. As shown, pipeline 370 may be configured to read, from memory 120, biometric data 372, which may be protected by encryption in some embodiments or being stored in an associated part of memory 120 that is only accessible to SEP 130. (In another embodiment, SEP 130 may store data 372 internally.) In various embodiments, image sensor pipeline 370 is configured to perform or facilitate disclosed anti-spoofing techniques.

Note that although biometric storage 380 is included in SEP 130 in the illustrated embodiment, in other embodiments SEP 130 is configured to encrypt authorized user biometric data 382 (e.g., using an encryption key in key storage 360) and store the encrypted data outside of SEP 130. In some embodiments, the encryption key used for such encryption never leaves SEP 130 and is unique to device 100, which may improve security of such encrypted data when stored outside of SEP 130. Biometric data 142 may include template data for storage and/or live data used for authentication.

Exemplary Camera Module

Figure 4:
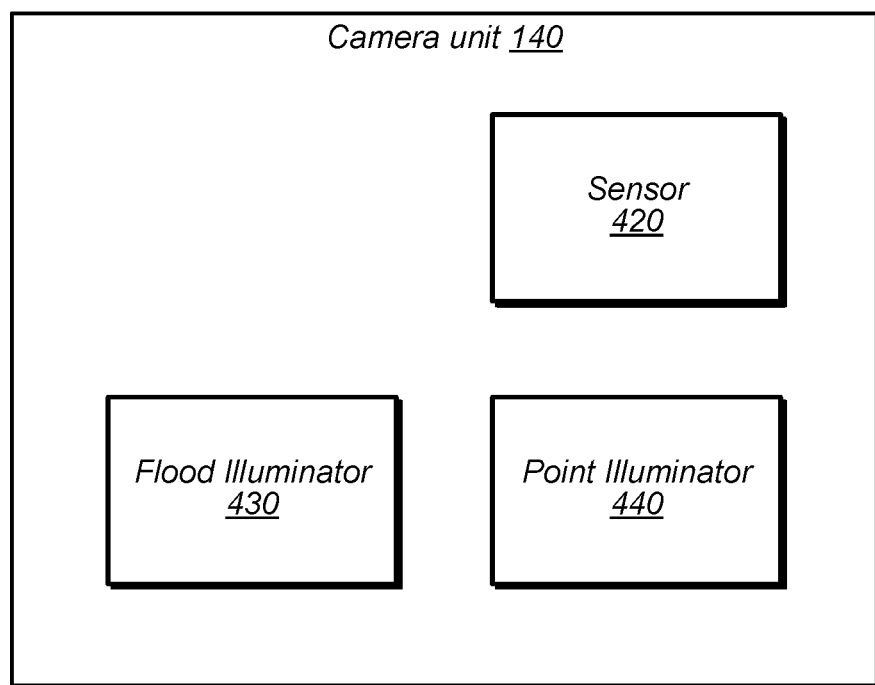
FIG. 4 is a block diagram illustrating an exemplary camera unit, according to some embodiments.

FIG. 4 is a block diagram illustrating an exemplary camera unit 140, according to some embodiments. In the illustrated embodiment, module 140 includes sensor 420, flood illuminator 430, and point illuminator array 440. In some embodiments, the illustrated elements are all configured to operate using infrared signals. In other embodiments, camera unit 140 may be configured to operate using other wavelengths, e.g., may include both RBG and infrared emitters and/or sensors, etc.

Sensor 420, in the illustrated embodiment, is configured to capture image data based on incoming radiation. In some embodiment, sensor 420 includes an array, e.g., of charge coupled device (CCD) or complementary metal oxide semiconductor (CMOS) elements. In some embodiments, imaging data from sensor 420 is usable to determine depth information, e.g., based on a known configuration and pattern generated by point illuminator array 440. In some embodiments, device 100 is configured to combine an image captured using flood illuminator 430 with an image captured using point array illuminator 440 to generate a composite depth image, e.g., of a user's face.

Flood illuminator 430, in the illustrated embodiment, is configured to generate a broad-beam of illumination in a desired spectrum. Thus, images captured using flood illuminator 430 may be used for two-dimensional analysis.

Point illuminator 440, in the illustrated embodiment, is configured to generate a known pattern of points of illumination. For example, point illuminator may be implemented using one or more vertical-cavity surface-emitting laser (VCSEL) circuits. In some embodiments, a different light source element (e.g., laser) is used for each point of illumination. In other embodiments, a given light source may be used to generate multiple points of illumination, e.g., using diffractive lensing. Therefore, in various embodiments, point illuminator 440 is configured to generate multiple discrete points of illumination for image capture. These points of illumination may be used to generate three-dimensional image data (in combination with two-dimensional image data from flood capture mode, in some embodiments).

Exemplary Emitter Arrays for Depth Capture and Probing Pattern

Figure 5:
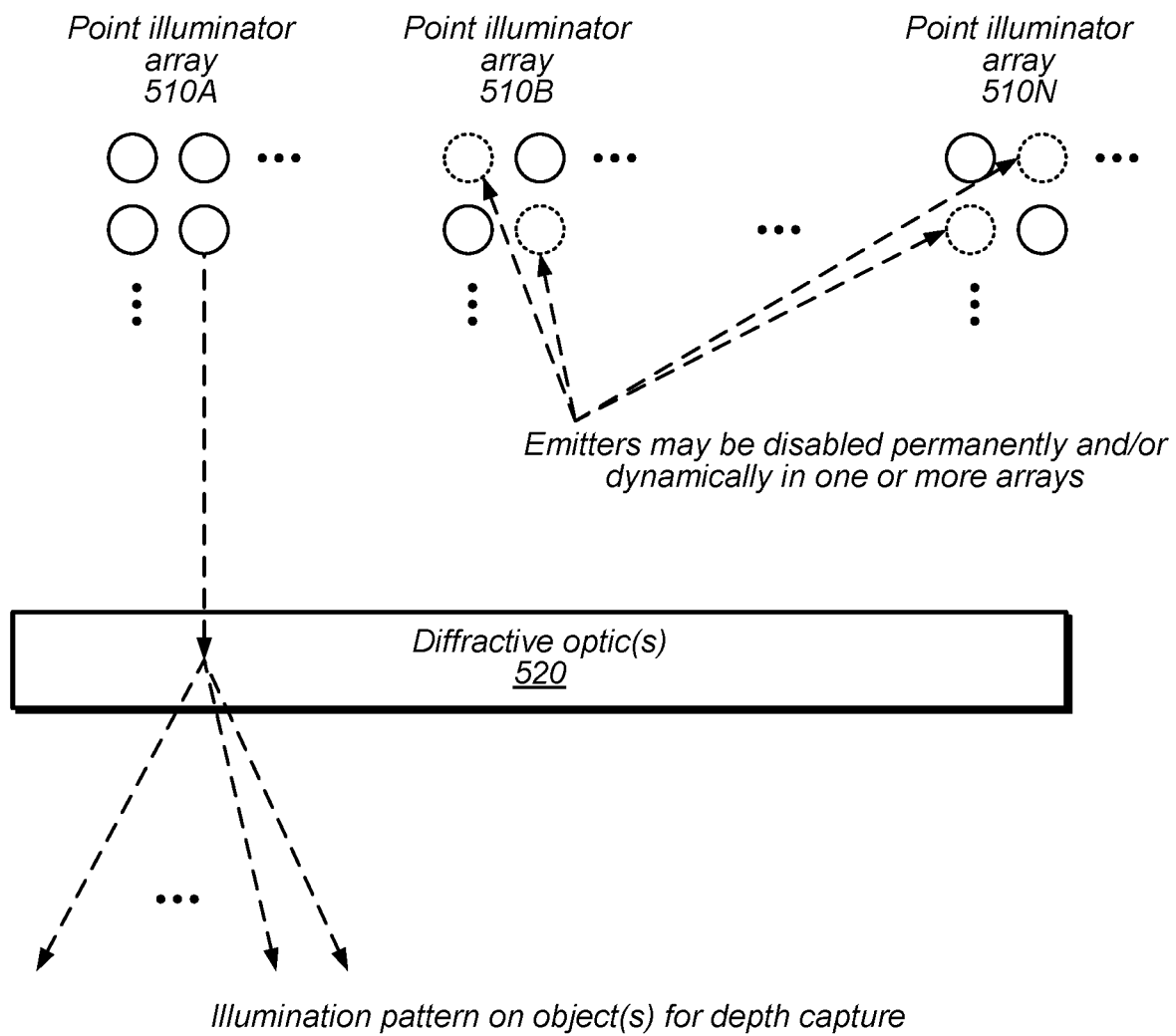
FIG. 5 is a block diagram illustrating multiple point illuminator arrays, according to some embodiments.

FIG. 5 is a diagram illustrating multiple exemplary arrays of point illuminators that may be included in element 440, according to some embodiments. In the illustrated embodiment, a device includes multiple point illuminator arrays 510A-510N and one or more diffractive optics 520. These arrays may be used for depth capture modes and/or generating a probing pattern, in some embodiments.

Point illuminator arrays 510, in the illustrated embodiments, each include multiple emitters (e.g., VCSEL emitters) that are shown as circles and configured to generate points of illumination. The different arrays may each include the same number of emitters or different numbers of emitters. In some embodiments, a first set of one or more arrays is used for normal depth captures and a second set of one or more special arrays are used for one or more probing patterns, which may be used to authenticate camera unit 140. In some embodiments, the special arrays are not used for normal depth capture modes (other than for detecting a probing pattern). In other embodiments, one or more arrays may be used for both.

Diffractive optic(s) 520, in the illustrated embodiment, are configured to generate multiple points of illumination for a given emitter. For example, infrared emissions from a single emitter may be used to generate tens or hundreds of projected illumination points. The overall illumination pattern for depth capture mode may include tens of thousands of dots, for example. This may allow a relatively small number of emitters to generate points for a wide field of view.

Diffractive optic(s) 520 may generate a known pattern and changes in the pattern in captured images (relative to capturing a flat object, for example) may be used to determine depth, when projected onto other objects.

As shown, emitters may be disabled permanently and/or dynamically in one or more arrays. For example, emitters may be permanently disabled during manufacturing of the device. In the illustrated example, arrays 510A and 510B have emitters at different positions disabled (e.g., as indicated using the dashed circuits), which may result in different probing patterns depending on which of these arrays are used. In dynamic embodiments, similar techniques of disabling different emitter positions may be used to generate different probing patterns at different times, using a given array. In some embodiments, metadata used to select a particular secret pattern does not indicate characteristics of the pattern (e.g., it may simply be an index of the pattern from an array of patterns) and characteristics of the pattern for verifying the pattern are controlled by SEP 130 (e.g., stored in SEP 130 or encrypted by SEP 130 and stored elsewhere). In some embodiments, one or more validations (e.g., verification of the pseudo-random sequence) must pass prior to firing a probing pattern, which may reduce the ability to replay a probing pattern. Further, multiple probing patterns may be used to increase replay difficulty, e.g., because a replayed image may be unlikely to have the same probing pattern as the currently-used probing pattern.

In some embodiments, the device is configured to use different special illuminator arrays or patterns for different facial recognition sessions, e.g., in a sequential or pseudo-random fashion. This may prevent malicious entities from capturing an illumination pattern and re-using the illumination pattern and/or may allow multiple probing pattern attempts before locking a user out of the device. In some embodiments, software running on device 100 is configured to select which special arrays are used for which facial recognition sessions (although the software may have no knowledge of the actual patterns implemented by the different sub-arrays). In some embodiments the software is executed by SEP 130. In some embodiments, software executed elsewhere may use an API to request such functionality from SEP 130.

In some embodiments, a manufacturer may implement arrays 510 with a sufficient number of emitters to implement a relatively large number of different patterns (e.g., hundreds or thousands of patterns or more). Therefore, in embodiments with permanent array configuration, the likelihood of a probing pattern used for one device also being used for another device may be quite low. In other embodiments, a manufacturer may use unique probing patterns for each device, such that a probing pattern used by one device will not be used by any other devices. Further, different orderings of probing patterns may be used on different devices in embodiments where at least some of the same probing patterns are used for different devices.

During manufacturing, a camera unit 140 may be paired with other circuitry in a device (e.g., SEP 130) using the camera unit's configured probing pattern(s). For example, the manufacturer may capture one or more probing patterns using camera unit 140 and store captured data (which may be at least partially processed, e.g., to detect the pattern used) securely (e.g., within SEP 130 or encrypted by SEP 130 using a secret key specific to that SEP 130 and stored in another location). When device 100 is used for facial recognition, SEP 130 may verify that one or more frames of image data captured by camera unit 140 exhibit the expected probing pattern.

In some embodiments, probing patterns may be checked to within a threshold degree of matching but not require an exact match. This may be implemented for static and/or dynamic embodiments. This may allow verification of different patterns in the presence of noise or equipment failures (e.g., if a particular emitter that was expected to be turned on for a pattern is actually disabled due to equipment failure, the pattern still may be detected). Therefore, verification of the probing pattern may be performed to within a threshold certainty using one or more of various algorithms.

As discussed above, in some embodiments, device 100 is configured to dynamically enable or disable different emitters in an array 510 for a particular firing. For example, SEP 130 or image processor 160 may pseudo-randomly generate a requested pattern and SEP 130 may verify that camera unit 140 used the requested pattern. In some embodiments, template information specifying each pattern supported by camera module 140 (or each pattern that potentially may be used as a probing pattern) may be stored to determine matches with an expected pattern. In other embodiments, device 100 may be configured to verify an expected pattern without storing template image data for patterns, e.g., based on knowledge of the illuminator array and diffractive optics used.

In some embodiments, SEP 130 is configured to encrypt data used to specify what pattern is determined for use in a facial recognition session. For example, SEP 130 and camera module 140 may establish an ECDH session to encrypt information specifying which special arrays to fire for the probing pattern or information dynamically indicating which emitters in an array should be used to fire the probing pattern.

In some embodiments, multiple probing patterns are used during a facial recognition session. The patterns may be fired sequentially and/or in parallel. SEP 130 may verify that the specified timing and content of patterns is used. For example, if multiple probing patterns are fired at once, SEP 130 may verify the expected combination of patterns. In some embodiments, the timing of when one or more probing patterns is fired is randomized within a facial recognition session. This may include pseudo-randomly determining whether to fire the probing pattern before or after other events in the facial recognition and/or pseudo-randomly determining a point within a particular pre-determined interval within the session to fire the probing pattern (e.g., N ms may be allocated for firing the pattern and the actual firing time may occur pseudo-randomly within that time interval).

In some embodiments, SEP 130 is configured to validate a probing pattern by determining differences between the probing pattern and a normal depth capture pattern (i.e., a depth capture pattern used for depth determination for facial matching, which may differ from probing pattern(s) used for verification of camera unit 140). This may be particularly useful in embodiments where the probing pattern illumination points are a subset of the normal illumination points. SEP 130 may instruct camera unit 140 to capture two frames of image data, one using the probing pattern and the other using the normal pattern and process the images to generate a differential between the two patterns. This may help account for varying conditions such as temperature, ambient lighting, etc., for example, by ensuring that the conditions are substantially the same for the probing pattern and normal pattern being distinguished. In some embodiments, this technique may reduce the probability of false detections and false rejections of the probing pattern.

In some embodiments, the same set of one or more probing patterns may be used for multiple users registered on a device. In other embodiments, different sets of probing patterns may be used for different users. Template image data for facial recognition may be stored for each of multiple users of the device.

Exemplary Probing Pattern Method

Figure 6A:
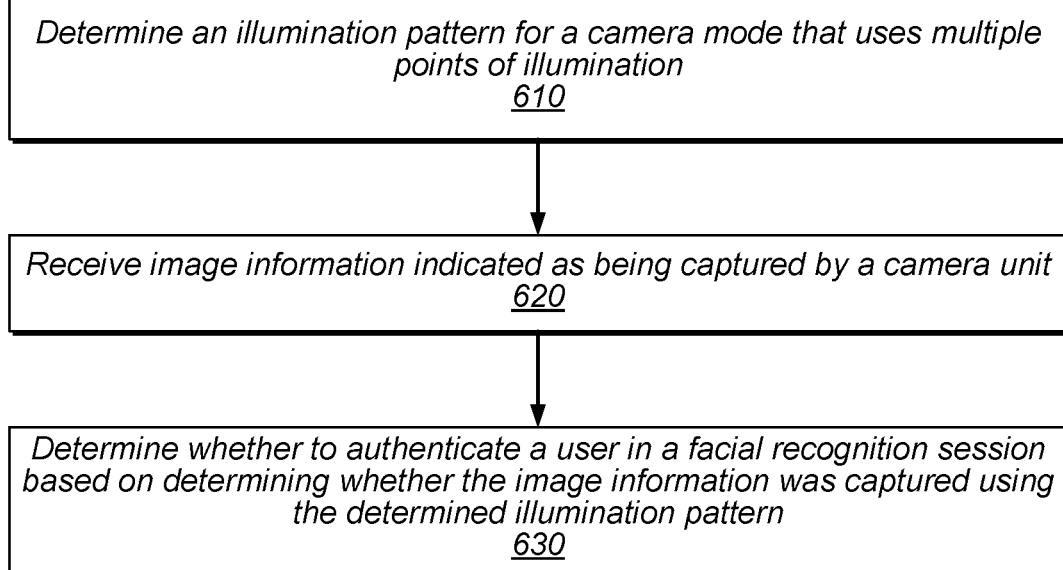
FIG. 6A is a flow diagram illustrating an exemplary method for determining and verifying a probing pattern, according to some embodiments.

FIG. 6A is a flow diagram illustrating an exemplary method for a secure facial recognition session using a probing pattern, according to some embodiments. The method shown in FIG. 6A may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, device 100 determines an illumination pattern (examples of which are referred to herein as probing patterns) for a camera mode that uses multiple points of illumination. The illumination pattern may be fixed for a given device 100, e.g., that such that the device always uses the same illumination pattern for the techniques of FIG. 6A. In other embodiments, SEP 130 or image processor 160 is configured to select the illumination pattern from a plurality of illumination patterns, e.g., in a pseudo-random fashion. The patterns may be permanently configured during manufacturing or dynamically controlled, for example. In multi-user embodiments, the pattern may be selected for a particular user. In some embodiments, SEP 130 determines whether to use the flood illuminator 430 with the probing pattern and/or when to fire the flood illuminator relative to the pattern with multiple illumination points.

At 620, in the illustrated embodiment, SEP 130 receives image information indicated as being captured by camera unit 140 (e.g., after it fires the determined illumination pattern and captures one or more images). The image information may be "indicated" as being captured by camera unit 140 based on metadata in the image information, a bus on which the information is received, timing of receiving the image data, etc. Note, however, that the information may not actually be captured by a camera unit of the apparatus, but may be captured by another unit masquerading as camera unit 140. The illumination pattern may facilitate detection of such attacks, in some embodiments, by enabling detection of the masquerading camera unit based on absence of the expected probing pattern.

At 630, in the illustrated embodiment, SEP 130 determines whether to authenticate a user in a facial recognition session based on whether the image information was captured using the determined illumination pattern. SEP 130 may indicate a facial recognition failure in response to determining that the image information was not captured using the determined illumination pattern. Confirmation of the pattern may indicate that the image data was not previously captured and replayed and/or was not captured by some other hardware masquerading as camera unit 140, in various embodiments.

Note that although facial recognition is discussed herein for purposes of explanation, the disclosed techniques may be used in various other contexts to verify that images are not replayed and/or that images are captured by a known camera unit.

Exemplary Storage of Calibration and Enrollment Data

In some embodiments, various device data is stored that may be used for the disclosed techniques. This data may be stored during manufacturing (e.g., based on hardware characteristics of a particular device) or during enrollment of a user for facial recognition authentication. In some embodiments, device data is backed up to one or more servers, e.g., via the internet. In some embodiments, at least a portion of the device data is signed and/or encrypted by SEP 130. The device data may allow restoration of a device to factory settings or a particular restore point, for example. The signing by SEP 130 may allow the SEP 130 to verify that the restore data is actually for the correct device while the encryption may prevent others from determining sensitive data.

In some embodiments, calibration data is stored during manufacturing for camera unit 140. For example, temperature may affect infrared capture modes, so images captured at multiple different temperatures may be captured and stored. In some embodiments, the images may be encrypted, processed, compressed, etc. before storage. In some embodiments, SEP 130 is configured to sign and/or encrypt this data so that it cannot be tampered with without detection and/or cannot be interpreted by malicious entities. Another example of calibration data is camera alignment data. In some embodiments, sparse calibration data may be stored and a full set of calibration data may be generated by device 100 by capturing additional sensor data and processing it in combination with the sparse calibration data.

In some embodiments, calibration data may include high-resolution captures (e.g., depth and flood captures) of a known reference image.

Probing pattern data (e.g., frames captured using the probing pattern or outputs of processing such frames) may be stored with calibration data, e.g., after encryption by SEP 130. In various embodiments, SEP 130 may include random data with the probing pattern data (or any other encrypted data discussed here) before encryption to increase security.

Template data for users may be similarly captured and stored when users are enrolled for facial recognition. For example, SEP 130 may capture multiple images of a user, process the images to generate a mathematical representation of a captured face (e.g., using feature vectors), and continue capturing images until the vectors meet one or more criteria. SEP 130 may encrypt the template data or store the template data internally. In some embodiments, multiple different facial poses may be captured during enrollment. SEP 130 may require another authentication type (e.g., a password or PIN) before allowing biometric enrollment. The captured images for enrollment may include various numbers of depth and flood image pairs, for example. In some embodiments, SEP 130 is configured to store data captured during the enrollment process, such as actual images captured during enrollment and/or mathematical representations of the face captured during enrollment. Saving the enrollment images themselves may allow mathematical representations to be re-generated, e.g., if the neural network is updated in the future, without requiring re-capturing of enrollment images. SEP 130 may sign and/or encrypt the enrollment data, in some embodiments, and verify the enrollment data before using it for facial recognition.

In some embodiments biometric data captured during enrollment is not stored anywhere other than device 100 (e.g., is not backed up using cloud techniques). In some embodiments, a diagnostic mode may allow sharing of biometric information, e.g., to help with support or troubleshooting relating to facial recognition.

In various embodiments, SEP 130 is configured to check authenticity of calibration and/or enrollment data, e.g., by confirming that the data was signed by SEP 130 and/or based on SEP 130 being able to decrypt the data, using its secret key, to generate data in an expected format.

Figure 6B:
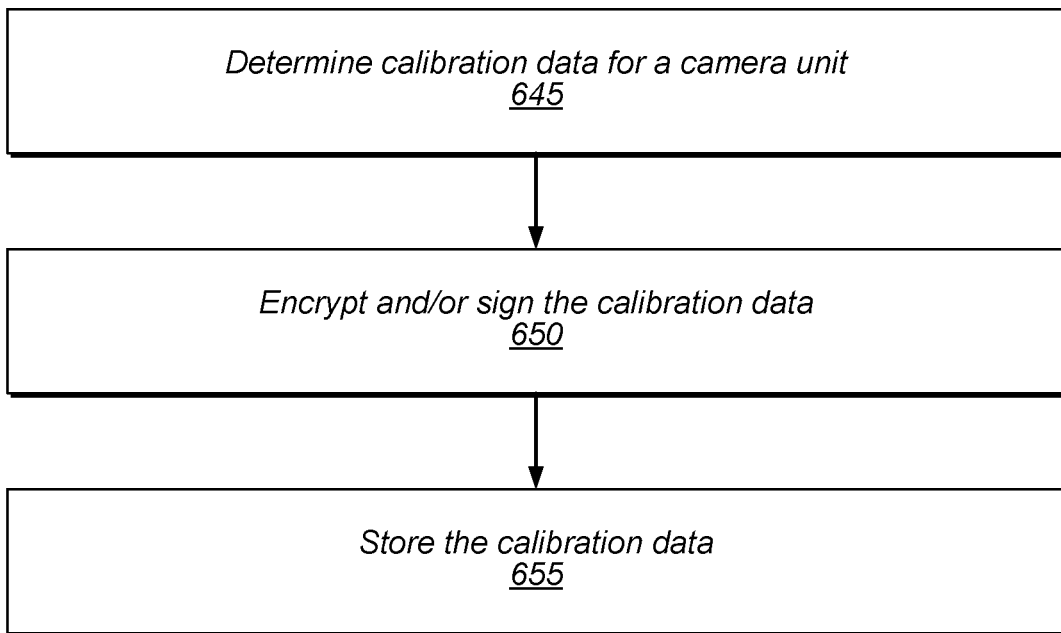
FIG. 6B is a flow diagram illustrating an exemplary method for determining and storing calibration data, according to some embodiments.

FIG. 6B is a flow diagram illustrating an exemplary method for generating and storing calibration data, according to some embodiments. The method shown in FIG. 6B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 645, in the illustrated embodiment, calibration data is determined for a camera unit. This may include capturing images in different conditions (e.g., different temperatures, orientations, etc.) using one or more camera modes (e.g., depth capture mode). This may include capturing one or more images of a known reference image. Determining the calibration data may include processing the captured image data, e.g., to determine characteristics of the data, compress the data, etc.

At 650, in the illustrated embodiment, a processing element (e.g., SEP 130) encrypts and/or cryptographically signs the calibration data. SEP 130 may perform this encryption and/or signature using an internal secret key that is unique to the SEP 130 of a given device.

At 655, in the illustrated embodiment, the calibration data is stored. In some embodiments, calibration data is stored in SEP 130. In other embodiments, the calibration data is stored outside of SEP 130, and may be loaded into memory accessible to SEP 130 on boot, for example. In some embodiments, the calibration is stored remotely, e.g., to a cloud backup system.

Figure 6C:
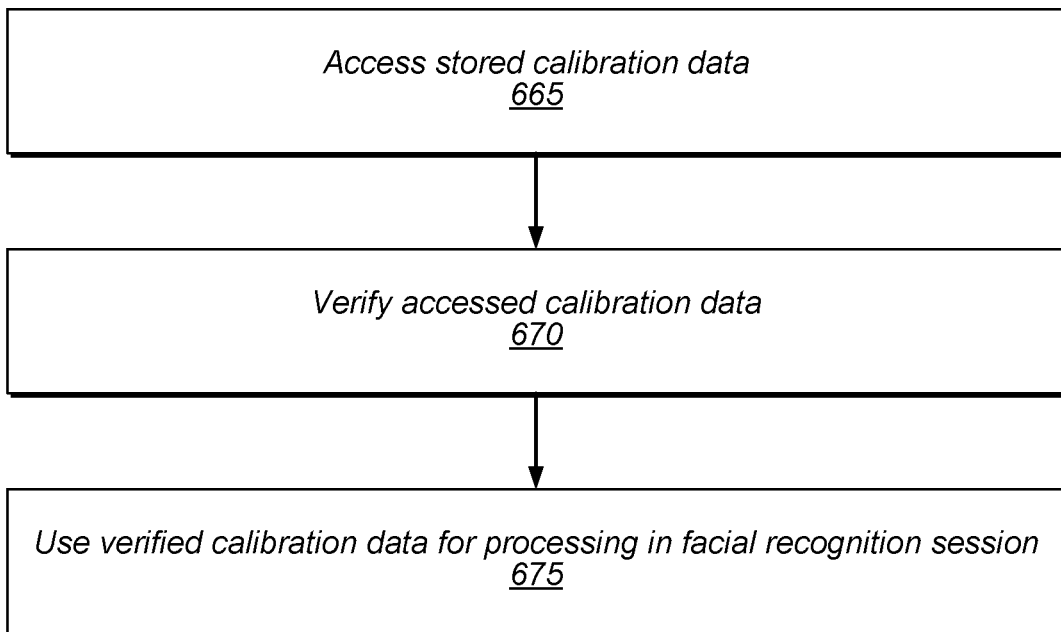
FIG. 6C is a flow diagram illustrating an exemplary method for accessing and using calibration data, according to some embodiments.

FIG. 6C is a flow diagram illustrating an exemplary method for using calibration data, according to some embodiments. The method shown in FIG. 6C may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 665, in the illustrated embodiment, stored calibration data is accessed. This may be performed on boot of the device or in response to initiation of a facial recognition session, for example.

At 670, in the illustrated embodiment, a processing element (e.g., SEP 130) verifies the accessed calibration data. This may include decrypting the calibration data and/or verifying a cryptographic signature of the calibration data, for example. If the calibration data is not verified, an error condition may be indicated and biometric authentication may not be allowed. In some embodiments, the calibration data is decompressed. The verification may avoid tampering or replacement of calibration data. If calibration data is compromised, it may be retrieved from backup storage (e.g., cloud backup) and restored.

At 675, in the illustrated embodiment, a processing element (e.g., SEP 130) uses the verified calibration data for processing in a facial recognition session. For example, the calibration data may be used for depth capture to determine facial feature vectors for face matching. The calibration data may also be used to process image data from one or more probing pattern captures to verify one or more probing patterns.

Exemplary Lockout Techniques

In some embodiments, device 100 is configured to impose a lockout in response to various event triggers. A lockout may prevent all access to a device for a predetermined time interval (or indefinitely) or may require additional authentication to bypass the lockout (e.g., using a password or PIN in addition to biometric authentication or a secret key known only to a manufacturer). For example, a "bio-lockout" may require one or more non-biometric authentication types before allowing access to device 100. In various embodiments, multiple different types of lockout may be implemented in a given device, with different intervals, unlock conditions, etc. The following discussion provides non-limiting examples of events that cause a lockout, in some embodiments.

In some embodiments, reboot of device 100 or a remote indication from a user may cause lockout. In some embodiments, a determination that a time interval has occurred since a last successful authentication of a user may cause a lockout. For example, if a user has not authenticated for multiple days, entry of a PIN or password may be required in addition to biometric authentication. In some embodiments, removal of a SIM card while device 100 is locked may cause a lockout. In some embodiments, dismissing an emergency screen in one or more ways may cause a lockout. In some embodiments, circumventing lockout may require permission from another trusted device or the user may be required to call a service to gain access.

Lockout triggers relating to biometric authentication may include: a particular number of unsuccessful match biometric attempts (attempts may only be counted if a face or fingerprint is detected, but does not match a known user, for example), a particular number of failures to match a sequence of image capture modes, a particular number of unsuccessful probing pattern checks, receipt of an image capture frame (e.g., by SEP 130) after expiration of a session key, receipt of an image capture frame with a missing or incorrect nonce, receipt of an image capture frame with a missing or incorrect signature, detected discrepancies relating to a received frame counter, a user not meeting an attention awareness threshold (e.g., because the user's eyes are not open or the user is not looking at or paying attention to the device), etc.

Note that, in some embodiments, multiple ones of these events may be counted together. As one example, both unsuccessful facial recognition matches and failures to match a sequence of image capture modes may be counted together and the count compared to a single threshold. Further, different triggers may cause different lockout intervals, and additional triggers may increase a current lockout interval.

Exemplary Method for Using Sequence of Image Capture Modes

Figure 7:
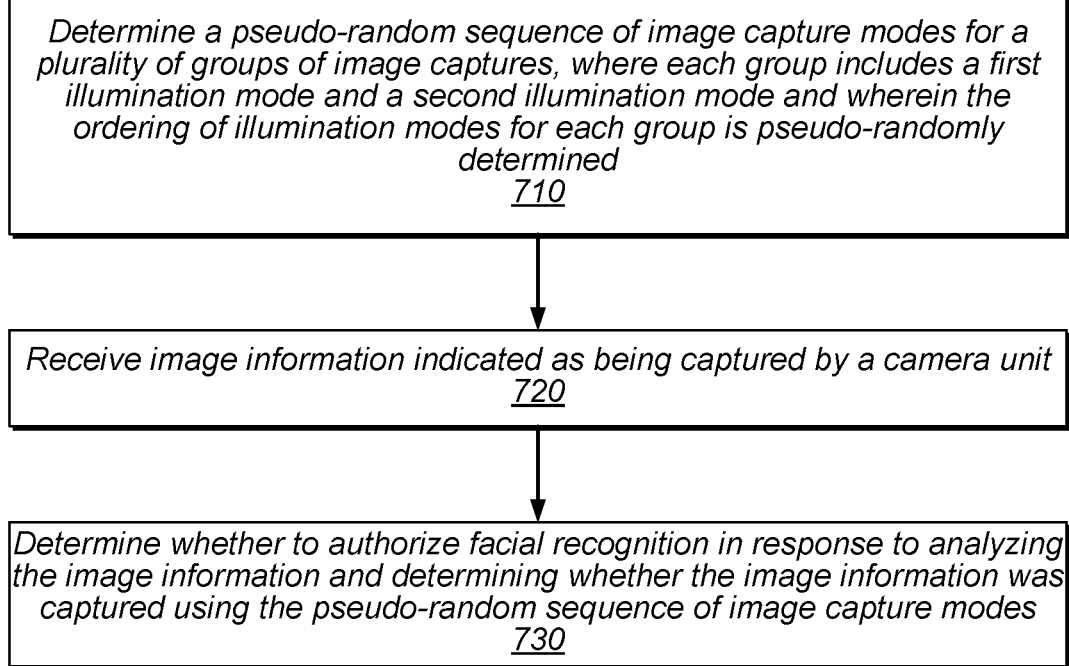
FIG. 7 is a flow diagram illustrating an exemplary method for determining and verifying a pseudo-random sequence of image capture modes, according to some embodiments.

FIG. 7 is a flow diagram illustrating an exemplary method for using a pseudo-random sequence in a secure facial recognition session (or more generally, a biometric authentication session), according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, device 100 determines a pseudo-random sequence of image capture modes for a plurality of groups of image captures. In the illustrated embodiment, each group includes a first illumination mode and a second illumination mode (e.g., a flood and a point illumination mode, in some embodiments. In some embodiments, these illumination modes correspond to a two-dimensional capture mode and a three-dimensional capture mode. In the illustrated embodiment, the ordering of the illumination modes for each group is pseudo-randomly determined. In other embodiments, the method of FIG. 7 may be performed by determining a pseudo-random sequence of image capture modes for a single group of image captures. In some embodiments, the number of captures in the sequence is pseudo-randomly determined. One example of a group of image captures is a pair of flood and depth captures that are combined to create a composite frame for facial recognition matching. In this context, a first pair may pseudo-randomly selected to be depth capture followed by flood capture and a second pair may pseudo-randomly selected to be flood capture followed by depth capture, and so on. In other embodiments, other types of sequences of capture modes may be implemented (e.g., with randomness among larger sets of captures than pairs, additional capture modes, etc.).

At 720, in the illustrated embodiment, SEP 130 receives information indicated as being captured by a camera unit (e.g., camera unit 140 may receive information indicated the determined sequence, capture image data using the sequence, and send the image data to SEP 130). Note that the information may not actually be captured by a camera unit of the apparatus, but may be captured by another unit masquerading as camera unit 140. The pseud-random sequence may facilitate detection of such spoofing, in some embodiments.

At 730, in the illustrated embodiment, SEP 130 determines whether to authorize in response to analyzing the image information and determining whether the image information was captured using the pseudo-random sequence of image capture modes. In some embodiments, SEP 130 may initiate firing of a probing pattern only after validating the sequence for a particular facial recognition session. If the sequence is not recognized, a facial recognition failure may occur, or SEP 130 may specify that another sequence should be captured. At this point, SEP 130 may also store and/or transmit information indicating that the incorrect sequence was detected and device 100 may implement one or more additional authentication requirements (e.g., requiring a manual entry of one or more authentication credentials in addition to facial recognition, a check for a maximum number of attempts before locking device 100 at least temporarily, etc.). If the sequence is verified, authentication may proceed (e.g., face matching, probing pattern, etc.). Verification of the sequence may substantially reduce the likelihood that the sequence was replayed from an earlier image of the user or generated by hardware masquerading as camera unit 140, in various embodiments.

Exemplary Facial Recognition Session with Multiple Validation Checks

Figure 8:
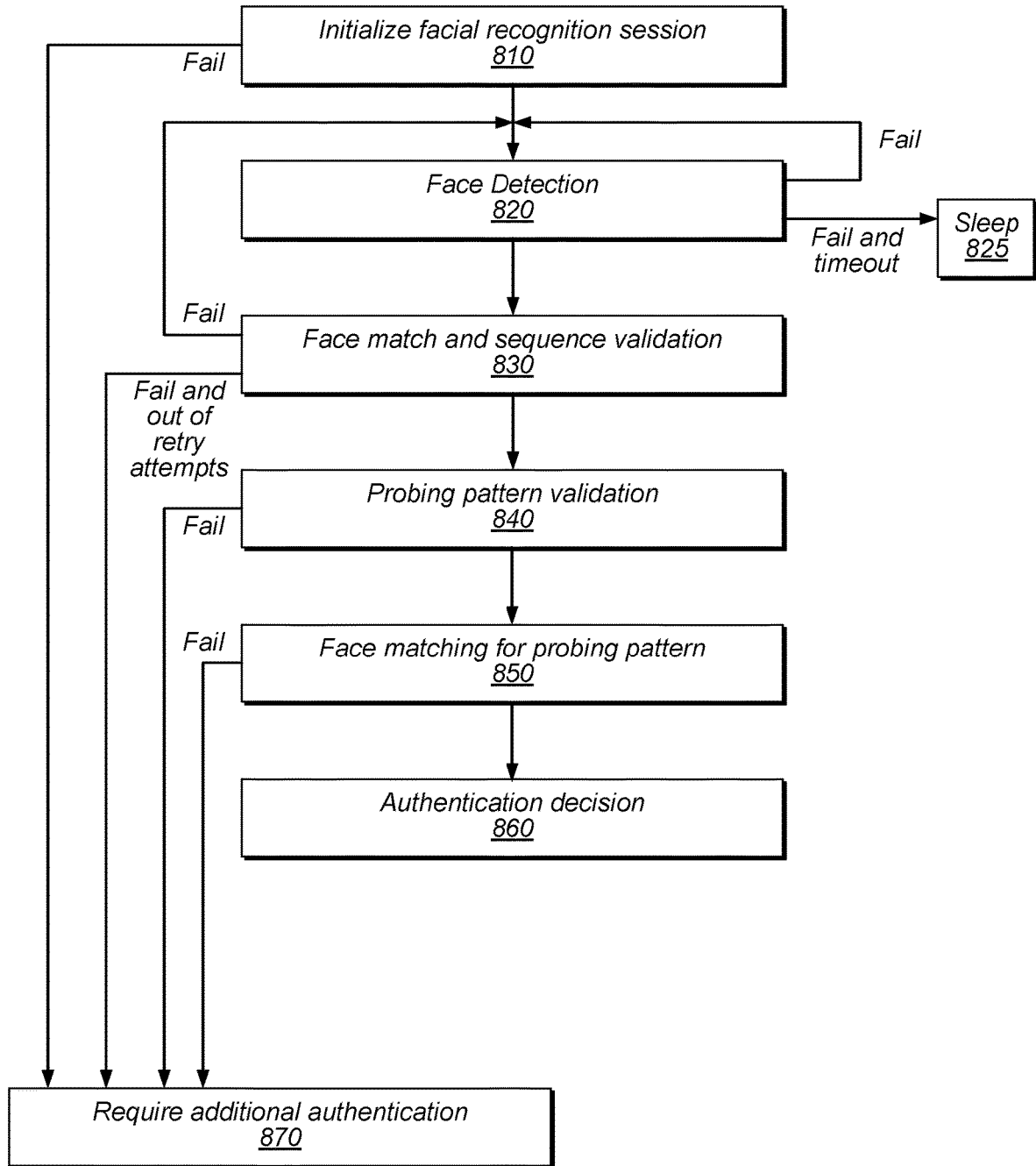
FIG. 8 is a flow diagram illustrating an exemplary facial recognition session, according to some embodiments.

FIG. 8 is a flow diagram illustrating an exemplary method for using multiple types of validation in a secure facial recognition session, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, device 100 initiates a facial recognition session. The session may be initiated in response to user input, e.g., using a physical button or selecting an option via a touchscreen. In some embodiments, a facial recognition session may be initiated in response to indication of a user interacting with device 100 such as movement of device 100 (e.g., indicating that a user has picked up device 100) or based on detection of a face or gaze of a user. In various embodiment, the session may be initiated automatically, e.g., when a user raises device 100 or taps the screen. In some embodiments, device 100 may automatically initiate the session before displaying a notification on a screed of device 100. In some embodiments, device 100 may prompt the user to being a facial recognition session (e.g., when requested by a third-party application) by indicating that biometric authentication should be performed (e.g., the user should look at the device) or the user should input a passcode. Method element 810 may include powering on hardware, accessing camera calibration data, communicating to establish one or more session keys between components, etc. As shown, a failure at 810 may cause flow to proceed to 870 and additional authentication (e.g., non-biometric authentication) may be required.

At 820, in the illustrated embodiment, device 100 determines whether a face is detected. This initial facial detection may be performed on data from camera unit 140 but the images used to determine whether a face is present may or may not be used for facial recognition comparison. If a face is not detected, flow remains at element 820 until a face is detected. If a face is detected, flow proceeds to 830. As shown, after a timeout interval and failure to detect a face, device 100 may sleep as shown in method element 825 (which may prevent excessive battery use, for example).

In some embodiments, device 100 may generate a bounding box around the detected face and may use the bounding box for subsequent operations (e.g., face matching, probing pattern validation, etc.). For example, image processor 160 may generate feature vectors only for objects within the bounding box. The bounding box may be determined using facial landmarks (e.g., nose, mouth, eyes, etc.) and may be used to generate a canonical face size that is used for facial recognition matching.

In some embodiments, device 100 may also check whether the user is paying attention at 820, e.g., by tracking their eye movement. If the user is not looking at the device, face detection element 820 may fail. This may avoid a user's face being used for biometric authentication when they are sleeping or not paying attention, for example.

At 830, in the illustrated embodiment, device 100 performs face match and sequence validation operations. In some embodiments, application software communicates with SEP 130 via an API to initiate element 830. SEP 130 may compare feature vectors from image frames processed by image processor 160 with template feature vectors for one or more users. SEP 130 may implement one or more neural networks to perform this comparison. Further, SEP 130 may determine whether a sequence of image capture modes was correctly used, e.g., using the techniques discussed above with reference to FIG. 7. In some embodiments, the sequence of capture modes is randomized for each facial recognition session. If face match or sequence validation fails, flow may proceed back to 820. If face match or sequence validation fails and a count of retry attempts has reached a threshold, flow may proceed to 870. Note that failure at this point may prevent a probing pattern from being fired (which may occur at 840 as discussed below), which may increase security of the probing pattern. In some embodiments, failure at 830 may impose a delay and/or may require detection of user intention to continue a facial recognition session (e.g., based on gaze, gesture, physical input such as a button, manual input such as using a touchscreen, etc.) before proceeding to face detection 820.

At 840, in the illustrated embodiment, SEP 130 validates a probing pattern. For example, SEP 130 may utilize the techniques described above with reference to FIG. 6A. As discussed above, the pattern may be permanently implemented in a special emitter array or dynamically generated and may be selected pseudo-randomly in either case. Multiple probing patterns may be validated. The probing pattern may be fired at various different locations in the sequence and the location may be randomized, in some embodiments. In some embodiments, if a probing pattern fails, one or more retries may be allowed, in which case flow may proceed back to element 820. SEP 130 or some other element may select the probing pattern.

In some embodiments, different biometric authentication modes may be utilized based on one or more contextual parameters. For example, in some embodiments a fast mode may be used when the previous authentication attempt was successful and a standard mode may be used when the previous authentication attempt was unsuccessful (or there has not been a successful attempt for a certain time interval, etc.). In some embodiments, the fast mode does not require verification of a facial recognition match before using a probing pattern (e.g., where use of the probing pattern may involve illuminating according to the probing pattern and capturing an image using the illumination). In some embodiments, the standard mode is configured to use a probing pattern only after performing a facial recognition match. Similarly, in some embodiments, the probing pattern may be used before verification of the sequence of image capture modes in one mode (e.g., the fast mode) and may be used only after verification of the sequence of image capture modes in another mode (e.g., the standard mode).

Therefore, in some embodiments, the fast mode may allow for a faster authentication session relative to the standard mode, e.g., because it does not need to wait for the same extent of prior verification before firing a probing pattern.

At 850, in the illustrated embodiment, SEP 130 performs face matching for the image data captured using the probing pattern. In some embodiments, this ensures that the probing pattern was used to capture the same face that was matched at 830. The matching of 850 may include comparison of feature vectors for the probing pattern frame(s) with previously captured frames during the facial recognition session (e.g., the sequence of captures validated at 830). In other embodiments, the matching may also be performed with user template data, in addition to or in place of matching with the captures from the sequence. If this matching fails, flow may proceed to 870.

At 860, in the illustrated embodiment, SEP 130 determines an authentication decision. If the decision is positive, a user may be allowed to unlock device 100 or perform cryptographic operations such as to provide an authentication decision to other elements, enable or disable peripheral devices, access keychain data, perform operation with a key accessible by SEP 130, access auto-fill data for a browser or other form, access data protected by SEP keys, allow payment functionality, download or access an application, etc.

At 870, additional authentication is required. In some embodiments method element 870 may correspond to multiple different lockout modes, which may impose timeout intervals, non-biometric authentication requirements, etc.

In some embodiments, the techniques of FIG. 8 may be performed within a relatively small time interval, e.g., in less than a second, to quickly and intuitively allow biometric authentication. In some embodiments, image data captured during a facial recognition session is discarded after determining an authentication result for the session.

Examples of different failures that may occur in FIG. 8 include, without limitation: no face and sequence not detected, which may cause the facial recognition session to start over (this may allow up to a threshold number of retries), face detected but sequence not detected in 830 (this may allow no retries or one retry), frame counter failure, camera or projection failures (e.g., due to lack of power), nonce failure, failure in frame signatures, etc. Ones of these failures may or may not cause device lockout, in some embodiments.

In some embodiments, the device is configured to perform one or more automatic re-tries if an authentication session fails. The automatic retries may be performed without the user performing an action requesting another session (e.g., without lowering and raising the device, without pressing a button, without interacting with a touchscreen, etc.). In some embodiments, the re-tries are only performed if one or more parameters are satisfied, e.g., the re-try may be have stricter parameters (relative to the session that failed) about the distance of the user's face to the camera, pose of the user's face, lack of occlusion, etc., before beginning.

In some embodiments, before allowing biometric authentication, device 100 is configured to require a user to set up device 100 with a passcode for unlocking the device. Biometric authentication (e.g., facial recognition) may then be used to unlock device 100 without using the passcode. This may allow device 100 to require a longer and/or more complex passcode than traditional passcodes, e.g., because the user may use the passcode less frequently. A stronger passcode may increase the overall security of device 100. In some embodiments, device 100 will always accept a passcode for a known user instead of facial recognition. In some embodiments, the passcode is required in the following exemplary situations: the device has just been turned on or restarted, the device has not been unlocked within a threshold time interval, the passcode has not been used to unlock the device within a threshold time interval, the device has received a remote lock command, facial recognition has been unsuccessful more than a threshold number of attempts, or power off or emergency mode has been initiated and then canceled.

In some embodiments, when biometric authentication is disabled, keys for highly protected data (e.g., data controlled by SEP 130) are discarded. Examples of such data may include keychain information such as form-filing information based on past activity of one or more authorized users on websites. In these embodiments, protected data is then inaccessible until device 100 is unlocked using the passcode. In some embodiments, when biometric authentication is enabled, such keys are not discarded when the device locks, but are wrapped with a key provided by SEP 130. If a facial recognition session is successful, SEP 130 may provide the key for unwrapping the data protection keys and unlock device 100. This cooperation between data protection and biometric authentication systems may increase security. In various embodiments, one or more keys relating to facial recognition are discarded when passcode entry is required, e.g., as discussed above.

Exemplary Organization of Modules

Figure 9:
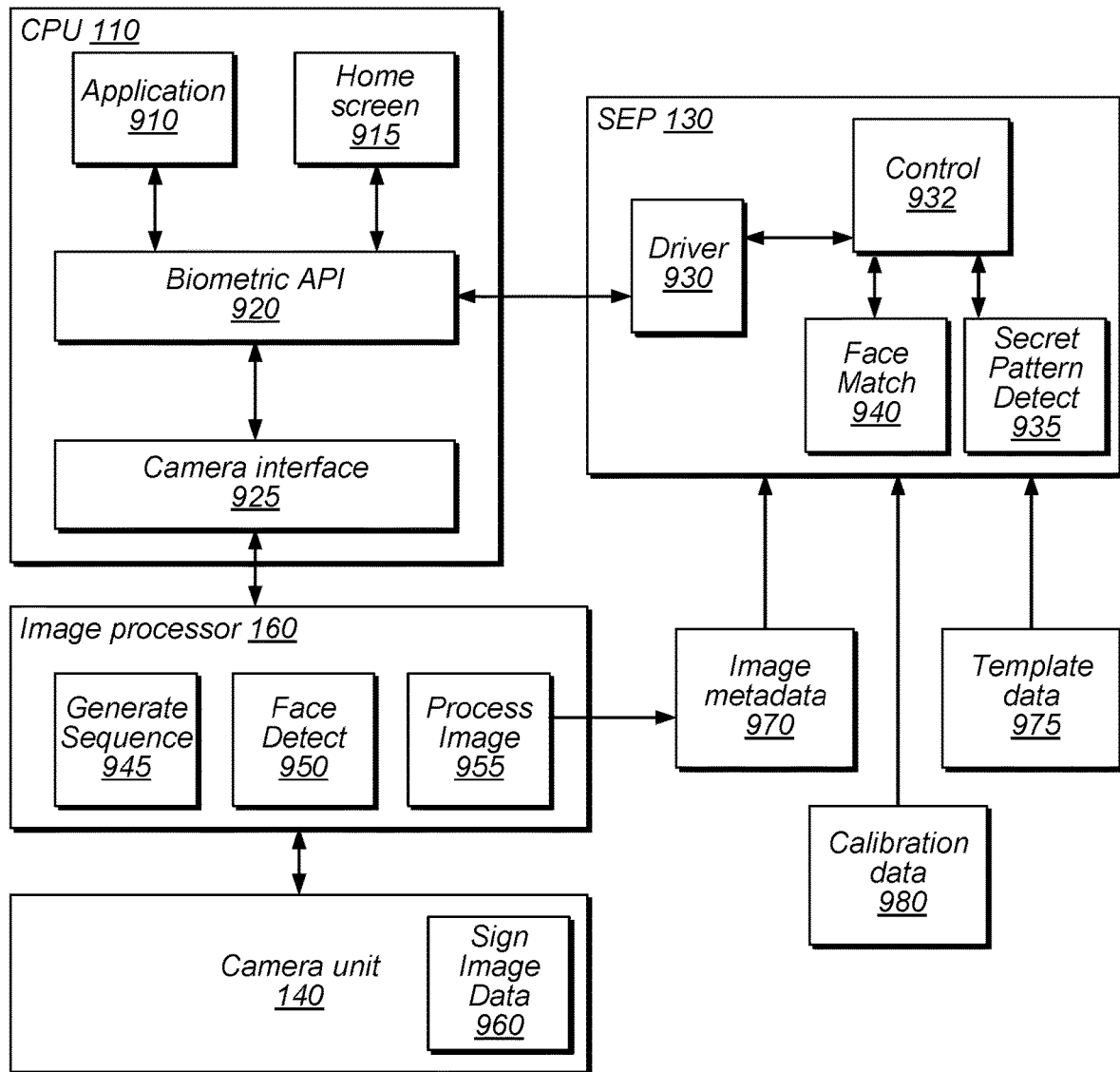
FIG. 9 is a block diagram illustrating exemplary modules configured to perform biometric authentication, according to some embodiments.

FIG. 9 is a block diagram illustrating an exemplary non-limiting organization of modules among CPU 110, SEP 130, image processor 160, and camera unit 140. The illustrated organization is shown for purposes of explanation, but is not intended to limit the scope of the present disclosure.

As used herein, the term "module" refers to program instructions executable to perform a function and/or circuitry configured to perform the function. Thus, various functionality described with reference to FIG. 9 may be performed by executing program instructions or by dedicated circuitry, for example.

In various embodiments, application 910 or home screen 915 may initiate a facial recognition session. For example, a user may perform an action indication facial recognition is desired (e.g., moving a device in a certain way such as turning it over or picking it up, pushing a physical button on a device, selecting a graphical option on a device, making a particular facial expression when looking at the device, saying a particular word or phrase, etc.). Application 910 may be a third party application, an operating system, a mobile payment application, etc.

For a payment application, for example, a payment may be authorized based on biometric authentication in combination with an indication of an intent to make a payment. Re-authentication may be required to change payment method, for example. In some embodiments, successful facial recognition must be confirmed within a time interval after the indication of intent to make a payment.

In some embodiments, third-party applications cannot access sensitive data relating to biometric authentication, but simply request biometric authentication and are notified whether the authentication was successful. Secure data such as keychain items may be protected by SEP 130, which may require a successful facial recognition session or entry of a passcode before releasing this data. Applications may be able to use facial recognition as a subsequent factor in multi-factor authentication. Further, third-party applications may be able to generate and use keys (e.g., ECC keys) that are protected by SEP 130.

Biometric API 920, in the illustrated embodiment, is used by application 910 and home screen application 915 to access device functionality. In some embodiments, API 920 may include both a user level and kernel level API. As shown in the illustrated example, API 920 may be used to send commands via camera interface 925 and SEP driver 930 (each of which may in turn implement an API for communicating with their respective components). Thus, an application 910 may request a facial recognition and/or specify parameters for the session (e.g., what security techniques are implemented) without having any exposure to sensitive data controlled by SEP 130 (such as identification of a probing pattern, template data for user facial characteristics, or the sequence of image capture modes for example).

In some embodiments, API 920 may allow an application to specify that only a portion of available validation techniques should be implemented. For example, the API 920 may allow specification of which elements of the method of FIG. 8 should be implemented for a particular facial recognition session.

Camera interface 925, in the illustrated embodiment, is configured to allow communications with image processor 160 via API 920. Similarly, driver 930, in the illustrated embodiment, is configured to allow communications with SEP 130 via API 920. In some embodiments, an illuminator interface module (not explicitly shown) is configured to allow communications between CPU 110 and one or more illumination modules via API 920.

Image processor 160, in the illustrated embodiment, includes generate sequence module 945 which may be configured to pseudo-randomly generate the sequence of image capture modes and communicate it to camera unit 140 and SEP 130 (e.g., via image metadata 970). In the illustrated embodiment, image processor 160 also includes face detect module 950 which may be configured to detect a face in frames captured by 140 to start a facial recognition session (e.g., image processor 160 may wait for module 950 to detect a face before generating the sequence with module 945). In the illustrated embodiment, image processor 160 also include process image module 955, which may be configured to process image data from camera unit 140 to generate image metadata 970.

Image metadata 970 may be stored in memory accessible to both image processor 160 and SEP 130 and may include feature vector data, sequence data, signature data, etc. In some embodiments, process image module 955 is configured to generate frame numbers for each frame or composite frame of image data and store the frame numbers in image metadata 970.

Camera unit 140, in the illustrated embodiment, includes sign image data module 960 which is configured to sign data using a secret key of camera unit 140. This may allow verification that image data is actually generated by camera unit 140 rather than another camera unit.

SEP 130, in the illustrated embodiment, further includes control module 932 which may be configured to perform various operations described. For example, control module 932 may run one or more neural networks to generate feature vectors for enrollment and/or matching image metadata 970 with template data 975. For initialization, control module 932 may establish secure session(s) with one or more other components. Control module 932 may also decrypt calibration data 980 and/or check that calibration data 980 is properly signed. SEP 130 may then send at least a portion of calibration data 980 to image processor 160 to facilitate processing by module 955. For facial matching, control module 932 may be configured to check if authentication is allowed, wait for user attention, and instruct image processor 160 to proceed with capturing the sequence. SEP 130 may then verify the sequence and perform matching based on image metadata 970. SEP 130 may also verify signatures of image metadata 970, verify that the frame looks as expected, and verify the nonce for each frame.

Calibration data 980, in the illustrated embodiment, is stored outside of SEP 130 and encrypted, but in other embodiments it may be stored within SEP 130 (e.g., in element 380). Generally, any of various functionality described herein as performed by SEP 130 may be performed without use of a secure circuit. Using a secure circuit to perform various functionality, however, may greatly increase security of facial recognition sessions.

In the illustrated embodiment, SEP 130 includes face match module 940 configured to perform facial recognition matching and secret pattern detect module 935 to detect one or more probing patterns in image metadata 970. Control module 932 may indicate when to fire a probing pattern and which pattern to fire.

The organization and elements of FIG. 9 are shown for purposes of explanation but are not intended to limit the scope of the present disclosure. In various embodiments, elements may be omitted or added and functionality described as performed by one element may be performed by one or more other elements.

Exemplary Device Configuration Method

Figure 10:
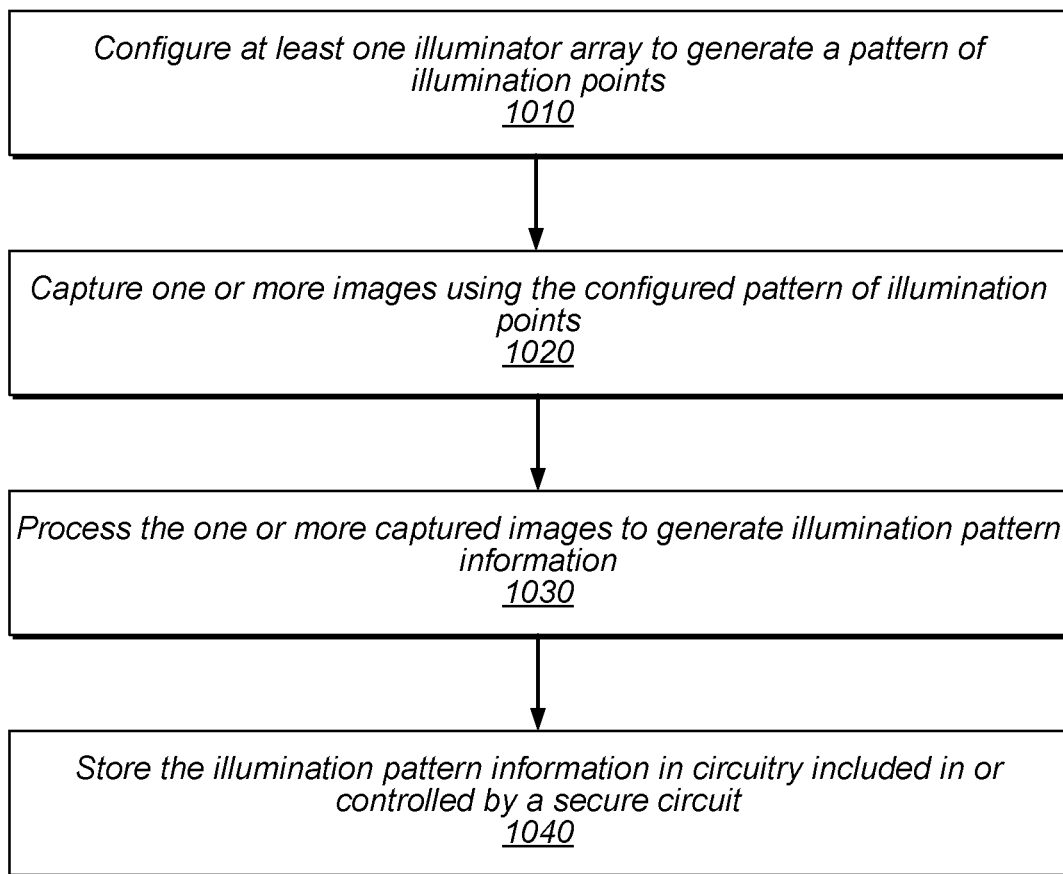
FIG. 10 is a flow diagram illustrating an exemplary method for manufacturing a device with a probing pattern, according to some embodiments.

FIG. 10 is a flow diagram illustrating an exemplary method for using multiple types of validation in a secure facial recognition session, according to some embodiments. The method of FIG. 10 may be performed during manufacturing of device 100, for example. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, at least one illuminator array is configured to generate a pattern of illumination points. This may include permanently disabling one or more emitters in the array, for example. In some embodiments, this may be performed in such a manner that the disabled emitters are not detectable visually. In some embodiments, multiple arrays may be configured, e.g., with different patterns.

At 1020, in the illustrated embodiment, one or more images are captured using the configured pattern of illumination points. For example, the camera module 140 may capture one or more frames while the illumination pattern is being emitted.

At 1030, in the illustrated embodiment, the one or more captured images are processed to generate illumination pattern information. This may include generating differential information between the pattern and another pattern (e.g., a complete pattern from an array of the same size). In various embodiments, various processing techniques may be used to generate characteristics of the pattern (which may then be used as a template to verify the probing pattern in the future).

At 1040, in the illustrated embodiment, the illumination pattern information is stored in circuitry included in or controlled by a secure circuit. For example SEP 130 may store the information internally or may encrypt the information using a secret key and store the information in another location of device 100. This may allow SEP 130 to verify the probing pattern in the future without other entities being able to determine the probing pattern. In some embodiments, the stored information includes actual image data captured using the probing pattern. In other embodiments, image data captured using the probing pattern is not stored at all, but only attributes of the image data such as a code that indicates which illumination points are turned on and off (e.g., generated in element 1030).

Exemplary Computer-Readable Media

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11:
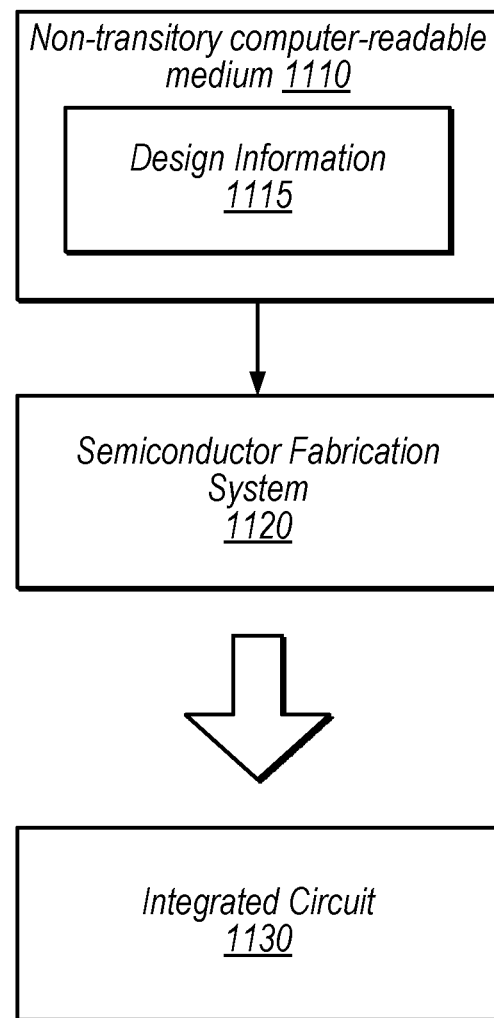
FIG. 11 is a diagram illustrating an exemplary computer-readable medium that stores design information, according to some embodiments.

FIG. 11 is a block diagram illustrating an exemplary non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable medium 1110, may comprise any of various appropriate types of memory devices or storage devices. Medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1110 may include other types of non-transitory memory as well or combinations thereof. Medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabrication at least a portion of integrated circuit 1130. The format of design information 1115 may be recognized by at least one semiconductor fabrication system 1120. In some embodiments, design information 1115 may also include one or more cell libraries which specify the synthesis and/or layout of integrated circuit 1130. In some embodiments, the design information is specified in whole or in part in the form of a netlist that specifies cell library elements and their connectivity.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIG. 1-5, or 9. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Additional Exemplary Embodiments

In some embodiments, a non-transitory computer-readable medium has instructions stored thereon that are executable by a computing device to perform operations comprising: determining a pseudo-random sequence of image capture modes for a plurality of pairs of image captures, wherein each pair includes captures using a first illumination mode and a second illumination mode, wherein the ordering of the first and second illumination modes for each pair is pseudo-randomly determined; receiving image information indicated as being captured by a camera unit; and determining whether to authorize facial recognition in response to analyzing the image information and determining whether the image information was captured using the pseudo-random sequence of image capture modes.

In some embodiments, a non-transitory computer-readable medium has instructions stored thereon that are executable by a computing device to perform operations comprising: determining an illumination pattern for a camera mode that uses multiple points of illumination; receiving image information captured by a camera unit; and determining whether to indicate a facial recognition failure based on determining whether the image information not captured using the determined illumination pattern.

In some embodiments, an apparatus comprises: a camera unit; one or more processing elements configured to, for a facial recognition session: determine a pseudo-random sequence of image capture modes for a plurality of image captures; receive first image information for a set of image captures, wherein the first image information is indicated as being captured by the camera unit based on the sequence; determine an illumination pattern for a camera mode that uses multiple points of illumination; request that the camera unit capture one or more images using the determined illumination pattern, wherein the apparatus is configured to emit the determined illumination pattern for the facial recognition session only after verification of the sequence of image capture modes; receive second image information indicated as being captured by the camera unit using the illumination pattern; and determine whether to indicate a facial recognition failure based on determining whether the second image information was captured using the determined illumination pattern.

In some embodiments, an apparatus comprises: one or more processing elements configured to, for a facial recognition session: detect whether a face is visible in images captured by a camera unit; in response to detecting a face, determine a pseudo-random sequence of image capture modes for a plurality of image captures; receive first image information indicated as being captured by the camera unit; in response to determining that the first image information was captured using the pseudo-random sequence of image capture modes, process the first image information for comparison with template facial information for one or more users; in response to detecting a match for a user of the one or more users, determine an illumination pattern in a three-dimensional capture mode that uses multiple points of illumination; receive second image information indicated as being captured by the camera unit based on the determined illumination pattern; in response to determining that the second image information exhibits the determined illumination pattern, determine whether a face shown in the second image information matches a face of the user; and authenticate the user in response to determining that the face shown in the second information matches a face of the user.

In some embodiments, the pseudo-random sequence of image capture modes includes a plurality of pairs of image captures, wherein each pair includes a two-dimensional capture mode and a three-dimensional capture mode, wherein the ordering of the two-dimensional and three-dimensional capture modes for each pair is pseudo-randomly determined, and wherein the image capture modes are supported by a camera unit.

In some embodiments, a method of manufacturing a mobile device, comprises: configuring at least one illuminator array to generate a pattern of illumination points; capturing, by a camera unit of the mobile device, one or more images using the configured pattern of illumination points; processing the one or more captured images to generate illumination pattern information; using a secure circuit of the mobile device to store the illumination pattern information in a mobile device configured to use the illuminator array for depth capture imaging.

In some embodiments, the method further comprises encrypting the illumination pattern, using the secure circuit, and storing the encrypted illumination pattern externally to the mobile device. In some embodiments, the method further comprises causing the encrypted illumination pattern to be transmitted to the mobile device for a restore procedure for the mobile device. In some embodiments, the illumination pattern information includes a frame of image data captured using the pattern. In some embodiments, the illumination pattern information includes an index of the pattern in a set of known patterns. In some embodiments, the illumination pattern information specifies one or more characteristics of the pattern.

In some embodiments, a non-transitory computer-readable medium has instructions stored thereon that are executable by a computing device to perform operations comprising: configuring at least one illuminator array to generate a pattern of illumination points; capturing one or more images using the configured pattern of illumination points; processing the one or more captured images to generate illumination pattern information; using a secure circuit to store the illumination pattern information in a mobile device configured to use the illuminator array for depth capture imaging.

Although specific embodiments have been described above and have been depicted in the accompanying appendix below, these embodiments are not intended to limit the scope of the present disclosure, even where only a single embodiment is described with respect to a particular feature. Examples of features provided in the disclosure are intended to be illustrative rather than restrictive unless stated otherwise. For example, references to the term "phone" may encompass any suitable mobile device. Accordingly, the above and below descriptions are intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

What is claimed is:

1. An apparatus, comprising:
    a camera unit;
    one or more processing elements configured to:
        determine a pseudo-random sequence of image capture modes for a plurality of groups of image captures, wherein each group includes at least a capture using a first illumination mode and a capture using a second illumination mode, wherein the ordering of the first and second illumination modes for each group is pseudo-randomly determined;
        receive image information for a set of image captures, wherein the image information is indicated as being captured by the camera unit; and
        determine whether to authorize facial recognition in response to analyzing the image information and determining whether the image information was captured using the pseudo-random sequence of image capture modes.

2. The apparatus of claim 1, wherein the first illumination mode uses flood illumination and the second illumination mode uses multiple discrete points of illumination and each group is a pair of captures using the first illumination mode and the second illumination mode.

3. The apparatus of claim 2, wherein the second illumination mode uses vertical-cavity surface-emitting laser (VCSEL) illumination to determine depth.

4. The apparatus of claim 1, wherein the one or more processing elements include a secure circuit, wherein the apparatus is configured not to allow access to hardware resources of the secure circuit other than via messages sent to a predefined set of one or more memory locations; and
    wherein the secure circuit is configured to determine whether the image information was captured using the pseudo-random sequence of image capture modes.

5. The apparatus of claim 4, wherein the secure circuit is configured to generate a different cryptographic nonce for ones of different facial recognition sessions, provide a cryptographic nonce to the camera unit, and confirm that each image in the sequence includes the cryptographic nonce.

6. The apparatus of claim 5, wherein the secure circuit is configured to communicate with the camera unit using an elliptic curve Diffie-Hellman (ECDH) session and wherein the secure element is configured to use a different ECDH exchanged secret key for communications during each of multiple different facial recognition sessions with the camera unit.

7. The apparatus of claim 5, wherein the secure circuit is configured to verify signature information for frames of image data in a facial recognition session, wherein the signature information is generated by the camera unit using a secret key.

8. The apparatus of claim 5, wherein the secure circuit is configured to verify frame count information for frames of image data captured during a facial recognition session.

9. The apparatus of claim 1, wherein the one or more processing elements are configured to communicate with the camera unit via a dedicated bus and wherein the apparatus is configured to require a user to manually enter one or more authentication credentials to access the apparatus in response to a disconnect of the dedicated bus.

10. A method, comprising:
    determining, by a computing device, a pseudo-random sequence of image capture modes for a plurality of groups of image captures, wherein each group includes at least captures using a first illumination mode and a second illumination mode, wherein the ordering of the first and second illumination modes for each pair is pseudo-randomly determined;
    receiving, by circuitry of the computing device, image information indicated as being captured by a known camera unit; and
    determining, by the circuitry, whether to authorize facial recognition in response to analyzing the image information and determining whether the image information was captured using the pseudo-random sequence of image capture modes.

11. The method of claim 10, wherein the first illumination mode uses flood illumination and the second illumination mode uses multiple discrete points of illumination.

12. The method of claim 10, wherein the circuitry is a secure circuit and the computing device is configured not to allow access to hardware resources of the secure circuit other than via messages sent to a predefined set of one or more memory locations.

13. The method of claim 10, further comprising:
    generating, by the circuitry, a different cryptographic nonce for ones of different facial recognition sessions;
    providing a cryptographic nonce to the camera unit; and
    confirming that each image in the sequence includes the cryptographic nonce.

14. The method of claim 10, further comprising:
    using, by the circuitry, a different ECDH exchanged secret key for communications during each of multiple different facial recognition sessions with a camera unit of the computing device.

15. The method of claim 10, further comprising:
    requiring a user to manually enter one or more authentication credentials to access the computing device in response to a disconnect of a bus used to communicate with a camera unit of the computing device.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:
    one or more processing elements configured to:
        determine a pseudo-random sequence of image capture modes for a plurality of groups of image captures, wherein each group includes a capture using a first illumination mode and a capture using a second illumination mode, wherein the ordering of the first and second illumination modes for each pair is pseudo-randomly determined;

receive image information for a set of image captures by a camera unit; and determine whether to authorize facial recognition in response to analyzing the image information and determining whether the image information was captured using the pseudo-random sequence of image capture modes.

17. The non-transitory computer readable storage medium of claim 16, wherein the first illumination mode uses flood illumination and the second illumination mode uses multiple discrete points of illumination.

18. The non-transitory computer readable storage medium of claim 16, wherein the one or more processing elements include a secure circuit, wherein the circuit is configured not to allow access to hardware resources of the secure circuit other than via messages sent to a predefined set of one or more memory locations; and wherein the secure circuit is configured to determine whether the image information was captured using the pseudo-random sequence of image capture modes.

19. The non-transitory computer readable storage medium of claim 18, wherein the secure circuit is configured to verify signature information for frames of image data in a facial recognition session, wherein the signature information is generated by a camera unit using a secret key.

20. The non-transitory computer readable storage medium of claim 18, wherein the secure circuit is configured to generate a different cryptographic nonce for ones of different facial recognition sessions, provide a cryptographic nonce to a camera unit, and confirm that each image in the sequence includes the cryptographic nonce.

* * * * *